US012625091B2

(12) United States Patent
Procter et al.

(10) Patent No.: US 12,625,091 B2
(45) Date of Patent: May 12, 2026

(54) SYSTEMS AND METHODS FOR AUTOMATICALLY GENERATING SYNTHETIC X-RAY SCAN DATA OF OBJECTS IN A PLURALITY OF ORIENTATIONS

(71) Applicant: Rapiscan Holdings, Inc., Hawthorne, CA (US)

(72) Inventors: Mark Procter, Wilmslow (GB); James Ollier, Huyton (GB)

(73) Assignee: Rapiscan Holdings, Inc., Torrance, CA (US)

( * ) Notice: Subject to any disclaimer, the term of this patent is extended or adjusted under 35 U.S.C. 154(b) by 216 days.

(21) Appl. No.: 18/639,217

(22) Filed: Apr. 18, 2024

(65) Prior Publication Data

US 2024/0402097 A1     Dec. 5, 2024

Related U.S. Application Data

(60) Provisional application No. 63/505,670, filed on Jun. 1, 2023.

(51) Int. Cl.
*G01N 23/04*          (2018.01)

(52) U.S. Cl.
CPC ....... *G01N 23/04* (2013.01); *G01N 2223/639* (2013.01)

(58) Field of Classification Search
CPC .......................... G01N 23/04; G01N 2223/639
See application file for complete search history.

(56) References Cited

U.S. PATENT DOCUMENTS

| | | | | |
|---|---|---|---|---|
| 5,128,365 A | | 7/1992 | Spector | |
| 5,600,303 A | | 2/1997 | Husseiny | |
| 5,806,521 A | * | 9/1998 | Morimoto | .............. A61B 8/463 |
| | | | | 600/447 |
| 5,838,759 A | * | 11/1998 | Armistead | ............. G01V 5/281 |
| | | | | 378/57 |

(Continued)

FOREIGN PATENT DOCUMENTS

| | | |
|---|---|---|
| CA | 2651131 | 11/2007 |
| CA | 2796809 | 10/2011 |

(Continued)

OTHER PUBLICATIONS

International Search Report for PCT/US24/25152, Aug. 12, 2024.

(Continued)

*Primary Examiner* — Blake C Riddick
(74) *Attorney, Agent, or Firm* — Novel IP

(57) ABSTRACT

Systems and methods of automatically generating synthetic X-ray scan data include generating scan data corresponding to a frame holding or supporting an object, wherein the frame and hence the object is manipulated, without manual intervention, to be positioned in a plurality of orientations in three dimensional space. Subsequently, X-ray scan data corresponding to the object is isolated and extracted from the X-ray scan data corresponding to the frame, the X-ray scan data corresponding to the object is adjusted and finally each of the adjusted X-ray scan data corresponding to the object is inserted into X-ray scan data of a cargo container in order to generate a plurality of X-ray scan data of the cargo container embedded with the object.

44 Claims, 12 Drawing Sheets

(56)                 References Cited

U.S. PATENT DOCUMENTS

| | | | | |
|---|---|---|---|---|
| 5,881,122 | A * | 3/1999 | Crawford | A61B 6/027 |
| | | | | 378/4 |
| 6,028,955 | A * | 2/2000 | Cohen | G06T 15/50 |
| | | | | 382/164 |
| 6,128,365 | A | 10/2000 | Bechwati | |
| 6,200,024 | B1 * | 3/2001 | Negrelli | A61B 6/4476 |
| | | | | 378/197 |
| 6,345,113 | B1 * | 2/2002 | Crawford | G06V 20/52 |
| | | | | 378/57 |
| 6,418,189 | B1 * | 7/2002 | Schafer | G01N 23/046 |
| | | | | 378/57 |
| H2110 | H | 10/2004 | Newman | |
| 6,813,374 | B1 * | 11/2004 | Karimi | G01V 5/20 |
| | | | | 378/207 |
| 6,825,854 | B1 | 11/2004 | Beneke | |
| 7,062,011 | B1 * | 6/2006 | Tybinkowski | G01V 5/226 |
| | | | | 378/57 |
| 7,193,515 | B1 | 3/2007 | Roberts | |
| 7,277,577 | B2 | 10/2007 | Ying | |
| 7,702,068 | B2 | 4/2010 | Scheinman | |
| 7,748,900 | B2 * | 7/2010 | Maschke | A61B 6/4458 |
| | | | | 378/197 |
| 8,009,864 | B2 | 8/2011 | Linaker | |
| 8,014,493 | B2 | 9/2011 | Roux | |
| 8,352,073 | B2 * | 1/2013 | Berti | B25J 9/1694 |
| | | | | 700/258 |
| 8,494,210 | B2 | 7/2013 | Gudmundson | |
| 8,633,823 | B2 | 1/2014 | Armistead, Jr. | |
| 8,693,731 | B2 | 4/2014 | Holz | |
| 8,875,226 | B1 | 10/2014 | Marek | |
| 9,042,511 | B2 | 5/2015 | Peschmann | |
| 9,042,661 | B2 | 5/2015 | Pavlovich | |
| 9,170,212 | B2 | 10/2015 | Bouchard | |
| 9,240,046 | B2 | 1/2016 | Carrell | |
| 9,911,282 | B2 | 3/2018 | Alewine | |
| 9,996,890 | B1 | 6/2018 | Cinnamon | |
| 10,282,902 | B1 * | 5/2019 | Mishra | G06T 17/20 |
| 10,473,811 | B1 * | 11/2019 | Bairashewski | G01V 5/22 |
| 10,817,722 | B1 | 10/2020 | Raguin | |
| 10,860,836 | B1 * | 12/2020 | Tyagi | G06V 10/454 |
| 2002/0159627 | A1 | 10/2002 | Schneiderman | |
| 2002/0186862 | A1 | 12/2002 | McClelland | |
| 2004/0066966 | A1 | 4/2004 | Schneiderman | |
| 2004/0124982 | A1 | 7/2004 | Kovach | |
| 2004/0263379 | A1 | 12/2004 | Keller | |
| 2005/0117700 | A1 | 6/2005 | Peschmann | |
| 2005/0157931 | A1 * | 7/2005 | Delashmit, Jr. | G06V 20/647 |
| | | | | 382/190 |
| 2006/0023835 | A1 * | 2/2006 | Seppi | G01V 5/20 |
| | | | | 378/57 |
| 2006/0070453 | A1 * | 4/2006 | Werve | G01N 21/954 |
| | | | | 73/800 |
| 2006/0088207 | A1 | 4/2006 | Schneiderman | |
| 2006/0197523 | A1 | 9/2006 | Palecki | |
| 2007/0076841 | A1 * | 4/2007 | Varadharajan | A61B 6/032 |
| | | | | 378/10 |
| 2007/0112556 | A1 | 5/2007 | Lavi | |
| 2007/0115123 | A1 | 5/2007 | Roberts | |
| 2007/0121783 | A1 | 5/2007 | Ellenbogen | |
| 2007/0140412 | A1 * | 6/2007 | Holt | A61B 6/032 |
| | | | | 378/8 |
| 2007/0150745 | A1 | 6/2007 | Peirce | |
| 2007/0235652 | A1 | 10/2007 | Smith | |
| 2008/0008353 | A1 | 1/2008 | Park | |
| 2008/0056444 | A1 | 3/2008 | Skatter | |
| 2008/0063140 | A1 | 3/2008 | Awad | |
| 2008/0170655 | A1 * | 7/2008 | Bendahan | G01V 5/226 |
| | | | | 378/9 |
| 2008/0170660 | A1 | 7/2008 | Gudmundson | |
| 2008/0240578 | A1 | 10/2008 | Gudmundson | |
| 2008/0270462 | A1 | 10/2008 | Thomsen | |
| 2008/0283761 | A1 | 11/2008 | Robinson | |

| | | | | |
|---|---|---|---|---|
| 2008/0298545 | A1 * | 12/2008 | Bueno | G01V 5/224 |
| | | | | 378/57 |
| 2008/0298546 | A1 * | 12/2008 | Bueno | G01V 5/222 |
| | | | | 250/359.1 |
| 2008/0309484 | A1 | 12/2008 | Francis | |
| 2009/0005668 | A1 * | 1/2009 | West | A61B 6/547 |
| | | | | 600/407 |
| 2009/0012383 | A1 * | 1/2009 | Virtue | A61B 8/5238 |
| | | | | 600/407 |
| 2009/0067575 | A1 * | 3/2009 | Seppi | G01V 5/226 |
| | | | | 378/57 |
| 2009/0180678 | A1 * | 7/2009 | Kuduvalli | A61B 6/588 |
| | | | | 382/154 |
| 2009/0296880 | A1 * | 12/2009 | Beets | A61B 6/4441 |
| | | | | 378/98.12 |
| 2009/0316853 | A1 * | 12/2009 | Parazzoli | G01N 23/046 |
| | | | | 378/4 |
| 2010/0046704 | A1 | 2/2010 | Song | |
| 2010/0098316 | A1 * | 4/2010 | Papaioannou | A61B 6/022 |
| | | | | 378/197 |
| 2010/0166322 | A1 | 7/2010 | Madruga | |
| 2010/0303287 | A1 * | 12/2010 | Morton | H01J 35/045 |
| | | | | 382/100 |
| 2010/0329532 | A1 * | 12/2010 | Masuda | G01N 23/046 |
| | | | | 378/58 |
| 2011/0033024 | A1 * | 2/2011 | Dafni | A61B 6/027 |
| | | | | 378/11 |
| 2011/0077523 | A1 * | 3/2011 | Angott | A61B 8/4405 |
| | | | | 600/587 |
| 2011/0186739 | A1 * | 8/2011 | Foland | G01V 5/22 |
| | | | | 378/19 |
| 2011/0206179 | A1 * | 8/2011 | Bendahan | G01V 5/22 |
| | | | | 378/19 |
| 2011/0206240 | A1 | 8/2011 | Hong | |
| 2011/0255663 | A1 * | 10/2011 | Roy | G01V 5/22 |
| | | | | 378/57 |
| 2011/0268247 | A1 * | 11/2011 | Shedlock | G01V 5/22 |
| | | | | 378/62 |
| 2012/0076257 | A1 * | 3/2012 | Star-Lack | G01V 5/226 |
| | | | | 378/57 |
| 2012/0093288 | A1 * | 4/2012 | Mastronardi | G01N 23/04 |
| | | | | 378/57 |
| 2012/0293633 | A1 | 11/2012 | Yamato | |
| 2012/0304085 | A1 | 11/2012 | Kim | |
| 2013/0086674 | A1 | 4/2013 | Horvitz | |
| 2013/0126299 | A1 | 5/2013 | Schoepe | |
| 2013/0156156 | A1 * | 6/2013 | Roe | G01V 5/223 |
| | | | | 378/57 |
| 2013/0163811 | A1 | 6/2013 | Oelke | |
| 2013/0208124 | A1 | 8/2013 | Boghossian | |
| 2013/0211419 | A1 * | 8/2013 | Jensen | A61B 6/4441 |
| | | | | 606/130 |
| 2013/0211420 | A1 * | 8/2013 | Jensen | A61B 34/20 |
| | | | | 606/130 |
| 2013/0215114 | A1 * | 8/2013 | Cherkashin | G06T 7/564 |
| | | | | 345/420 |
| 2013/0215264 | A1 | 8/2013 | Soatto | |
| 2013/0294574 | A1 | 11/2013 | Peschmann | |
| 2013/0322742 | A1 | 12/2013 | Walton | |
| 2014/0054465 | A1 * | 2/2014 | Berke | G01T 1/29 |
| | | | | 250/358.1 |
| 2014/0119604 | A1 | 5/2014 | Mai | |
| 2014/0198899 | A1 | 7/2014 | Ziskin | |
| 2014/0233692 | A1 * | 8/2014 | Case | G06F 3/04842 |
| | | | | 715/781 |
| 2014/0270059 | A1 * | 9/2014 | Suppes | G01N 23/046 |
| | | | | 378/20 |
| 2014/0270536 | A1 | 9/2014 | Amtrup | |
| 2014/0294147 | A1 * | 10/2014 | Chen | G01V 5/232 |
| | | | | 378/57 |
| 2014/0321710 | A1 * | 10/2014 | Robert | A61B 34/20 |
| | | | | 382/103 |
| 2014/0344533 | A1 | 11/2014 | Liu | |
| 2015/0117603 | A1 * | 4/2015 | Keeve | A61B 6/4458 |
| | | | | 378/189 |

(56) References Cited

U.S. PATENT DOCUMENTS

| | | | |
|---|---|---|---|
| 2015/0168570 A1* | 6/2015 | Pelc | G01N 23/046 |
| | | | 378/5 |
| 2015/0238159 A1* | 8/2015 | Al Assad | A61B 6/4014 |
| | | | 378/5 |
| 2015/0325010 A1* | 11/2015 | Bedford | G06T 11/003 |
| | | | 378/57 |
| 2016/0098620 A1 | 4/2016 | Geile | |
| 2016/0117898 A1 | 4/2016 | Kuznetsov | |
| 2016/0183899 A1* | 6/2016 | Vancamberg | A61B 6/4476 |
| | | | 378/37 |
| 2016/0189509 A1 | 6/2016 | Malhotra | |
| 2016/0199666 A1* | 7/2016 | Maurer | A61B 6/4452 |
| | | | 378/4 |
| 2016/0216398 A1 | 7/2016 | Bendahan | |
| 2016/0223706 A1* | 8/2016 | Franco | G01V 5/224 |
| 2016/0232689 A1 | 8/2016 | Morton | |
| 2016/0249869 A1* | 9/2016 | Papalazarou | A61B 6/4266 |
| | | | 378/62 |
| 2016/0302871 A1* | 10/2016 | Gregerson | A61B 34/20 |
| 2016/0356915 A1 | 12/2016 | Green | |
| 2017/0061625 A1 | 3/2017 | Estrada | |
| 2017/0083792 A1 | 3/2017 | Rodríguez-Serrano | |
| 2017/0116511 A1 | 4/2017 | Kim | |
| 2017/0209111 A1* | 7/2017 | Choi | A61B 6/032 |
| 2017/0236232 A1 | 8/2017 | Morton | |
| 2017/0263019 A1 | 9/2017 | Song | |
| 2017/0278300 A1 | 9/2017 | Hurter | |
| 2017/0296137 A1* | 10/2017 | West | G06T 11/005 |
| 2017/0316285 A1 | 11/2017 | Ahmed | |
| 2017/0319160 A1* | 11/2017 | Lu | A61B 6/512 |
| 2017/0350834 A1 | 12/2017 | Prado | |
| 2018/0055467 A1* | 3/2018 | Cox | A61B 6/4458 |
| 2018/0060722 A1 | 3/2018 | Hwang | |
| 2018/0061090 A1* | 3/2018 | Jerebko | G06T 11/008 |
| 2018/0089816 A1 | 3/2018 | Potter | |
| 2018/0150713 A1 | 5/2018 | Farooqi | |
| 2018/0214112 A1* | 8/2018 | Graziani | A61B 6/4405 |
| 2018/0224569 A1* | 8/2018 | Paresi | G01N 23/046 |
| 2018/0289982 A1* | 10/2018 | Sayeh | G16H 40/63 |
| 2018/0293734 A1 | 10/2018 | Lim | |
| 2018/0338742 A1* | 11/2018 | Singh | A61B 6/587 |
| 2018/0351634 A1 | 12/2018 | Ryan | |
| 2019/0041341 A1* | 2/2019 | Paresi | G01N 23/10 |
| 2019/0200945 A1* | 7/2019 | Tsuyuki | A61B 6/0487 |
| 2019/0231292 A1* | 8/2019 | Mertelmeier | G06T 19/20 |
| 2020/0003703 A1* | 1/2020 | Zavagno | G01N 23/083 |
| 2020/0073009 A1* | 3/2020 | Parikh | G01V 5/22 |
| 2020/0107794 A1* | 4/2020 | Mandelkern | G06T 7/136 |
| 2020/0147869 A1* | 5/2020 | Muir | B22F 10/28 |
| 2020/0160598 A1* | 5/2020 | Manivasagam | G05D 1/249 |
| 2020/0170598 A1* | 6/2020 | Shea | A61B 6/4078 |
| 2020/0320722 A1* | 10/2020 | Jordan | A61B 6/4258 |
| 2020/0363815 A1* | 11/2020 | Mousavian | G06N 3/088 |
| 2021/0004589 A1 | 1/2021 | Turkelson | |
| 2021/0031052 A1* | 2/2021 | Jordan | A61N 5/1081 |
| 2021/0158561 A1* | 5/2021 | Park | G06T 7/74 |
| 2021/0201476 A1* | 7/2021 | Prasad | G06T 7/50 |
| 2021/0225088 A1* | 7/2021 | Sivakumar | G06T 11/008 |
| 2021/0350532 A1* | 11/2021 | Kimmel | A61B 5/721 |
| 2022/0051412 A1* | 2/2022 | Parian | G06T 3/12 |
| 2022/0138952 A1* | 5/2022 | Crawford | G06T 7/11 |
| | | | 382/131 |
| 2022/0155440 A1* | 5/2022 | Kruse | A61B 8/5207 |
| 2022/0225957 A1* | 7/2022 | Kelly | A61B 6/54 |
| 2022/0262072 A1* | 8/2022 | Manivasagam | G06N 3/045 |
| 2022/0305290 A1* | 9/2022 | Jordan | A61N 5/1081 |
| 2022/0390391 A1* | 12/2022 | Bendahan | G01N 23/05 |
| 2022/0398717 A1* | 12/2022 | Hébert | G06N 3/09 |
| 2023/0011644 A1* | 1/2023 | Zhao | A61B 6/5282 |
| 2023/0147681 A1* | 5/2023 | Dinca | G01T 7/005 |
| | | | 378/1 |
| 2023/0154166 A1* | 5/2023 | Pauli | G06V 10/7747 |
| | | | 340/568.1 |
| 2023/0293131 A1* | 9/2023 | Bindley | A61B 6/505 |
| | | | 378/54 |
| 2023/0355194 A1* | 11/2023 | Gregerson | A61B 6/035 |
| 2023/0397957 A1* | 12/2023 | Crawford | G06T 7/0012 |
| 2024/0016549 A1* | 1/2024 | Johnson | A61B 34/32 |
| 2024/0020862 A1* | 1/2024 | Johnson | A61B 6/4441 |
| 2024/0164730 A1* | 5/2024 | Mc Carthy | A61B 6/035 |
| 2024/0245363 A1* | 7/2024 | Mason | A61B 6/4085 |
| 2024/0264331 A1* | 8/2024 | Zoboyan | G01T 1/2985 |
| 2024/0394886 A1* | 11/2024 | Deshpande | G06T 19/00 |
| 2025/0061620 A1* | 2/2025 | Salehi | G06T 11/006 |
| 2025/0078480 A1* | 3/2025 | Pauli | G06V 10/82 |

FOREIGN PATENT DOCUMENTS

| | | |
|---|---|---|
| CN | 104240784 | 12/2014 |
| JP | S643997 | 1/1989 |
| JP | H03103997 | 4/1991 |
| JP | H04103997 | 4/1992 |
| JP | 3103997 A | 11/1992 |
| JP | 2010520542 A | 6/2010 |
| JP | 2017062781 A | 3/2017 |
| WO | 2006119603 | 11/2006 |
| WO | 2008107112 | 9/2008 |
| WO | 2010050952 | 5/2010 |

OTHER PUBLICATIONS

Akcay, et al., "Transfer Learning Using Convolutional Neural Networks for Object Classification Within X-Ray Baggage Security Imagery," IEE International Conference on Image Processing (ICIP), Sep. 25, 2016, pp. 1057-1061.

Girshick, Ross ("Fast R-CNN," IEEE International Conference on Computer Vision, Dec. 7-13, 2015) (Year: 2015).

Salvador et al. ("Faster R-CNN Features for Instance Search," IEEE Conference on Computer Vision and Pattern Recognition Workshops (CVPRW), Jun. 26-Jul. 1, 2016) (Year: 2016).

He et al. "Mask R-CNN," Facebook AI Research (FAIR) Apr. 5, 2017, 10 pages.

He et al. "Deep Residual Learning for Image Recognition," Microsoft Research Dec. 10, 2015, 12 pages.

Simonyan et al. "Very Deep Convolutional Networks for Large-Scale Image Recognition," Visual Geometry Group, Department of Engineering Science, University of Oxford, Apr. 10, 2015, 14 pages.

Ren et al. "Faster R-CNN: Towards Real-Time Object Detection with Region Proposal Networks," Jan. 6, 2016, 14 pages.

Steitz et al. "Multi-view X-ray R-CNN," Department of Computer Science, TU Darmstadt, Darmstadt, Germany, Oct. 4, 2018, 16 pages.

Girshick et al. "Rich feature hierarchies for accurate object detection and semantic segmentation," Tech report (v5), UC Berkeley, Oct. 22, 2014, 21 pages.

Girshick, Ross "Fast R-CNN," Microsoft Research, Sep. 27, 2015, 9 pages.

Liu et al. "SSD: Single Shot MultiBox Detector," Dec. 29, 2016, 17 pages.

Lin et al. "Focal Loss for Dense Object Detection," Facebook AI Research (FAIR), Feb. 7, 2018, 10 pages.

Lin et al. "Microsoft COCO: Common Objects in Context," Feb. 21, 2015, 15 pages.

Lin et al. "Feature Pyramid Networks for Object Detection," Facebook AI Research (FAIR), Cornell University and Cornell Tech, Apr. 19, 2017, 10 pages.

Lin et al. "Cross-View Image Geolocalization," University of California, Brown University, 8 pages, 2013.

Krizhevsky et al. "ImageNet Classification with Deep Convolutional Neural Networks," 9 pages, /2012/.

Redmon et al. "You Only Look Once: Unified, Real-Time Object Detection," 10 pages, /2016/.

Isola et al. "Image-to-Image Translation with Conditional Adversarial Networks." Berkeley AI Research (BAIR) Laboratory, University of California, Berkeley, Nov. 21, 2016, 16 pages.

(56)     References Cited

OTHER PUBLICATIONS

Kalogerakis et al. "A Probabilistic Model for Component-Based Shape Synthesis." Standford University, ACM Transactions on Graphics 31:4, Jul. 2012, 13 pages.
Lin et al. "Feature Pyramid Networks for Object Detection," Facebook AI Research (FAIR), Cornell University and Cornell Tech, Jan. 6, 2016, 10 pages.
Reed et al., "Generative Adversarial Text to Image Synthesis", Proc. of ICML, 2016.
Shaoqing, et al., "Faster R-CNN: Towards Real-Time Object Detection with Region Proposal Networks," IEEE Transactions on Pattern Analysis and Machine Intelligence, vol. 39, No. 6, Jun. 1, 2017, pp. 1137-1149.
Nguyen et al., "Deep Neural Networks are Easily Fooled: High Confidence Predictions for Unrecognizable Images" (Year: 2015).
Bousmalis et al., "Unsupervised Pixel-Level Domain Adaptation with Generative Adversarial Networks", CVPR, Jul. 2017 (Year: 2017).

* cited by examiner

Coded Tag
118

110

6 axis Robotic Arm
116

Rotating turntable
112

114

106

100

120z

120y

120x

Spherical support
frame
102

Roller Base Plate

Translation Table
(Hoist)

Polystyrene Ball

Robotic Arm
116

Test Facility Hoist and
Translation stage
114

Rotating Platform
112

600

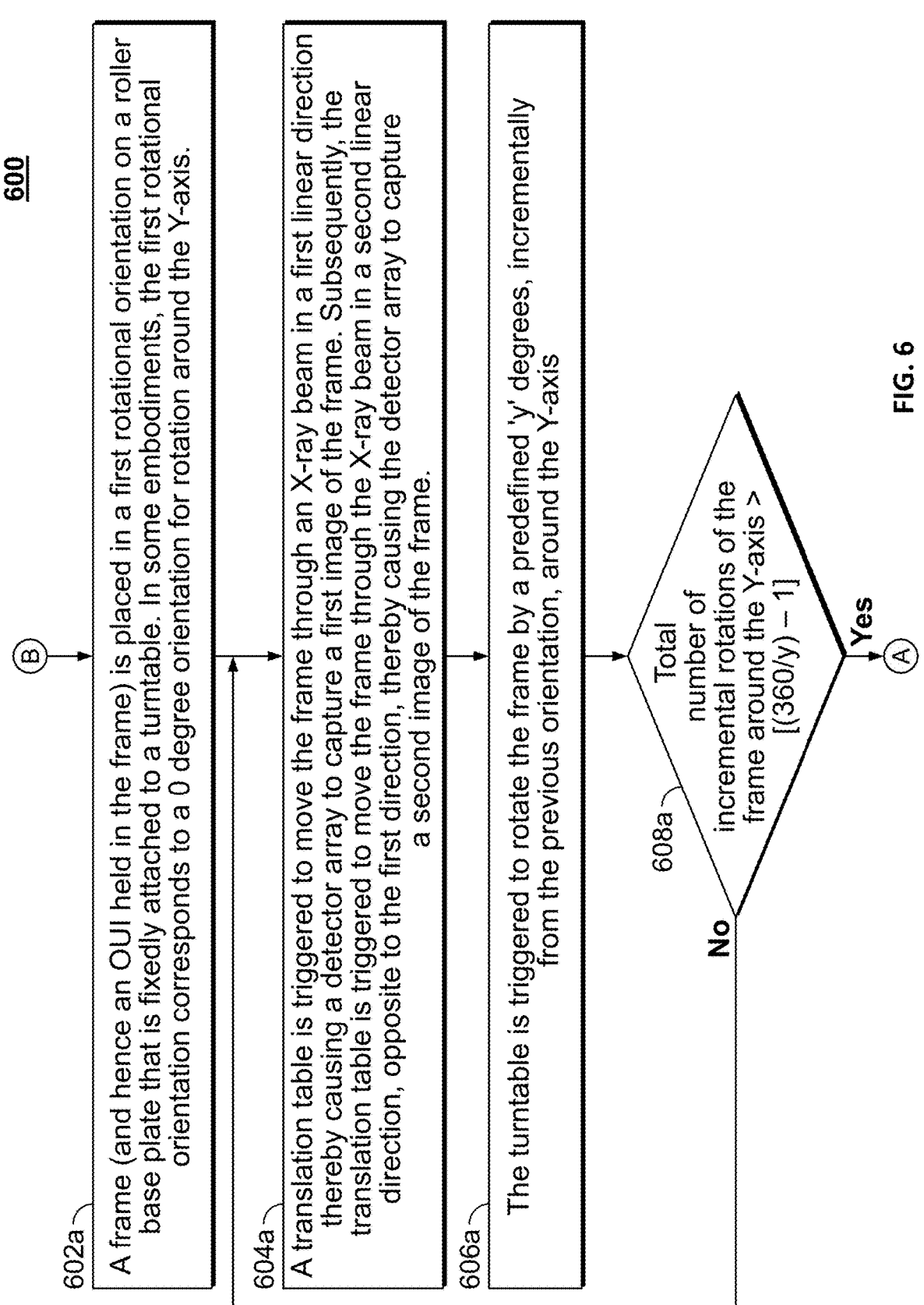

602a — A frame (and hence an OUI held in the frame) is placed in a first rotational orientation on a roller base plate that is fixedly attached to a turntable. In some embodiments, the first rotational orientation corresponds to a 0 degree orientation for rotation around the Y-axis.

604a — A translation table is triggered to move the frame through an X-ray beam in a first linear direction thereby causing a detector array to capture a first image of the frame. Subsequently, the translation table is triggered to move the frame through the X-ray beam in a second linear direction, opposite to the first direction, thereby causing the detector array to capture a second image of the frame.

606a — The turntable is triggered to rotate the frame by a predefined 'y' degrees, incrementally from the previous orientation, around the Y-axis 608a — Total number of incremental rotations of the frame around the Y-axis > [(360/y) − 1]

No

Yes

FIG. 6

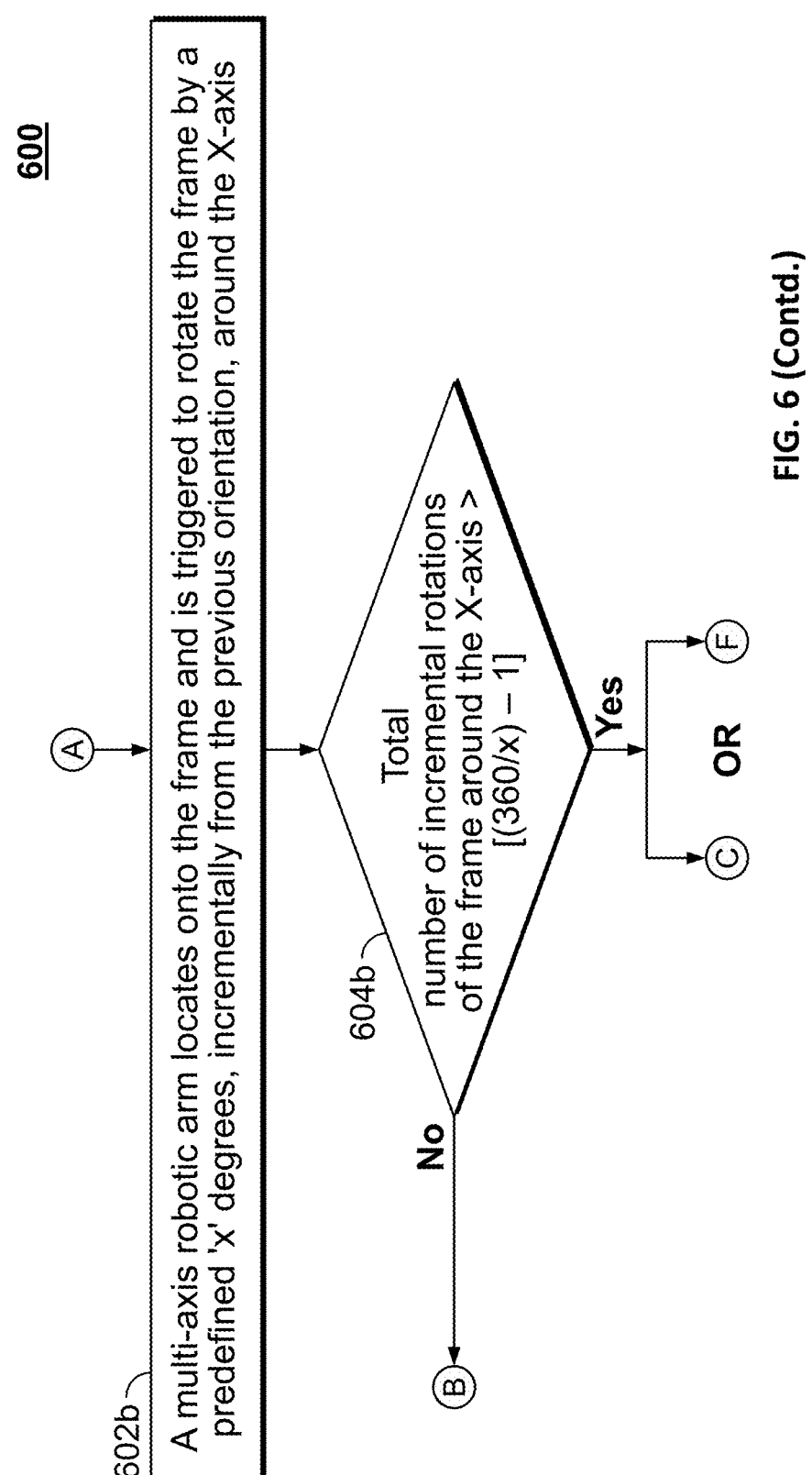
FIG. 6 (Contd.)

600

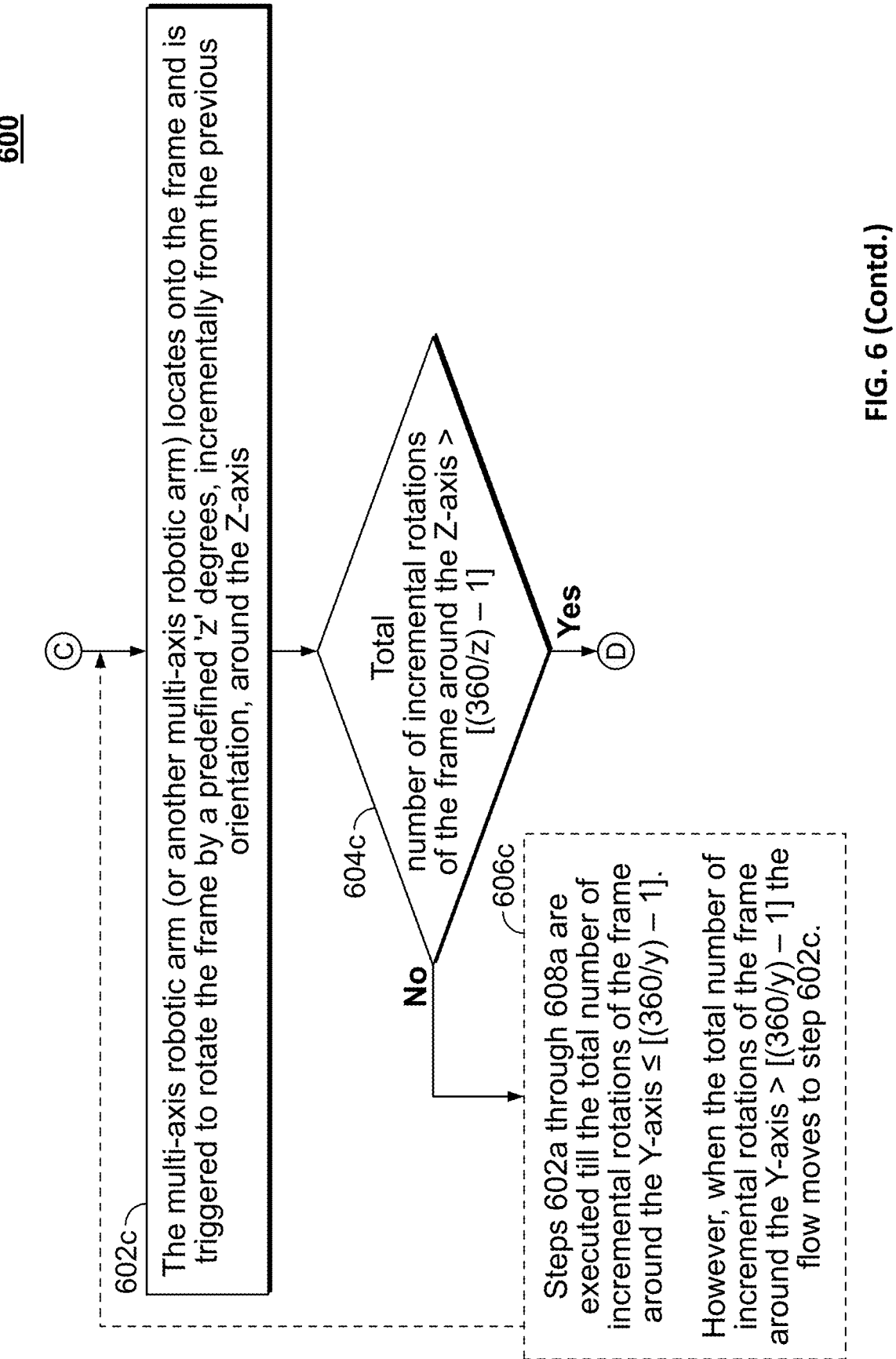

602c — The multi-axis robotic arm (or another multi-axis robotic arm) locates onto the frame and is triggered to rotate the frame by a predefined 'z' degrees, incrementally from the previous orientation, around the Z-axis 604c — Total number of incremental rotations of the frame around the Z-axis > $[(360/z) - 1]$

No

Yes

606c — Steps 602a through 608a are executed till the total number of incremental rotations of the frame around the Y-axis ≤ $[(360/y) - 1]$.

However, when the total number of incremental rotations of the frame around the Y-axis > $[(360/y) - 1]$ the flow moves to step 602c.

FIG. 6 (Contd.)

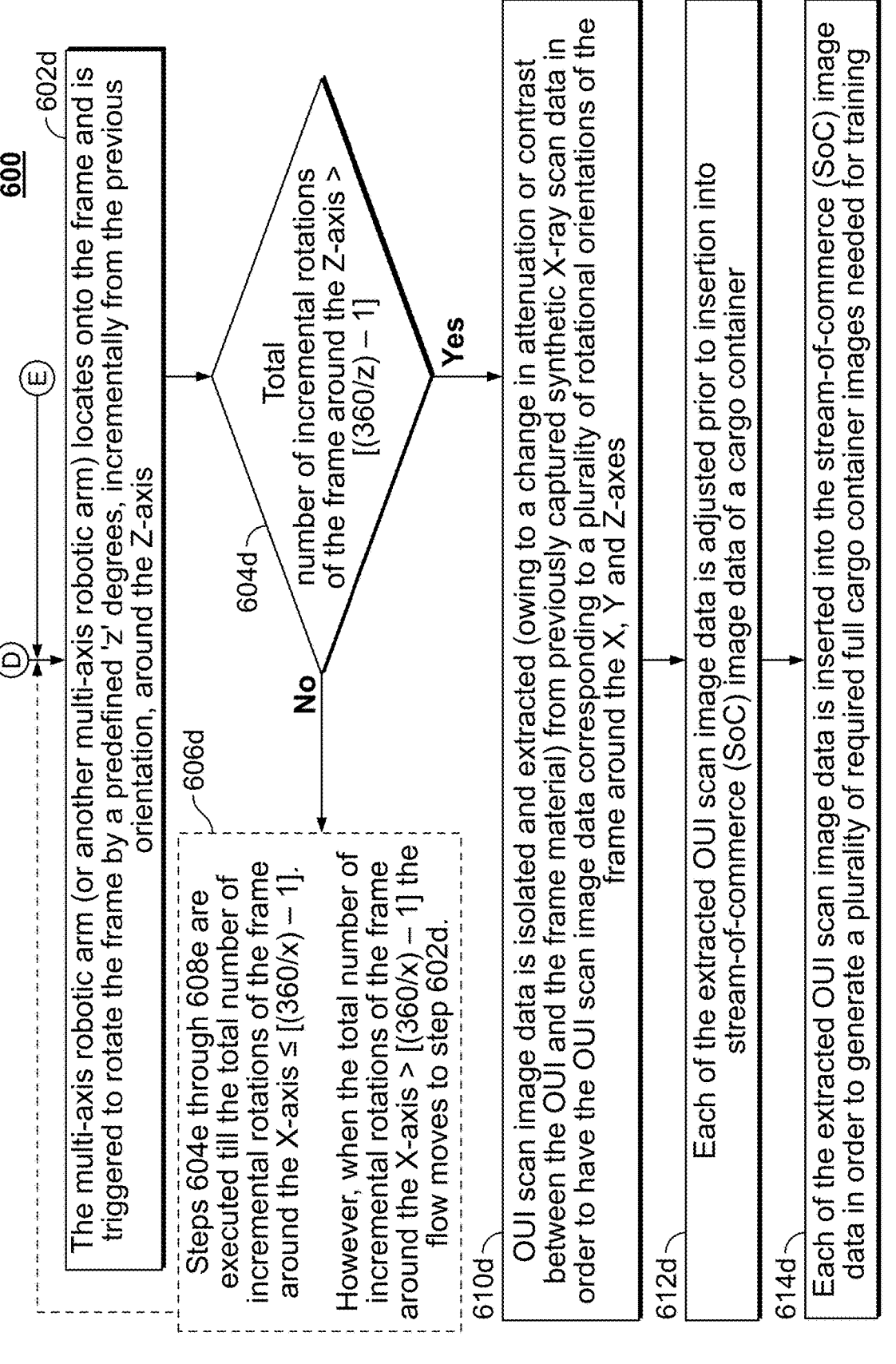

600

602d — The multi-axis robotic arm (or another multi-axis robotic arm) locates onto the frame and is triggered to rotate the frame by a predefined 'z' degrees, incrementally from the previous orientation, around the Z-axis 604d — Total number of incremental rotations of the frame around the Z-axis > [(360/z) − 1]

No

Yes

606d — Steps 604e through 608e are executed till the total number of incremental rotations of the frame around the X-axis ≤ [(360/x) − 1].

However, when the total number of incremental rotations of the frame around the X-axis > [(360/x) − 1] the flow moves to step 602d.

610d — OUI scan image data is isolated and extracted (owing to a change in attenuation or contrast between the OUI and the frame material) from previously captured synthetic X-ray scan data in order to have the OUI scan image data corresponding to a plurality of rotational orientations of the frame around the X, Y and Z-axes 612d — Each of the extracted OUI scan image data is adjusted prior to insertion into stream-of-commerce (SoC) image data of a cargo container 614d — Each of the extracted OUI scan image data is inserted into the stream-of-commerce (SoC) image data in order to generate a plurality of required full cargo container images needed for training

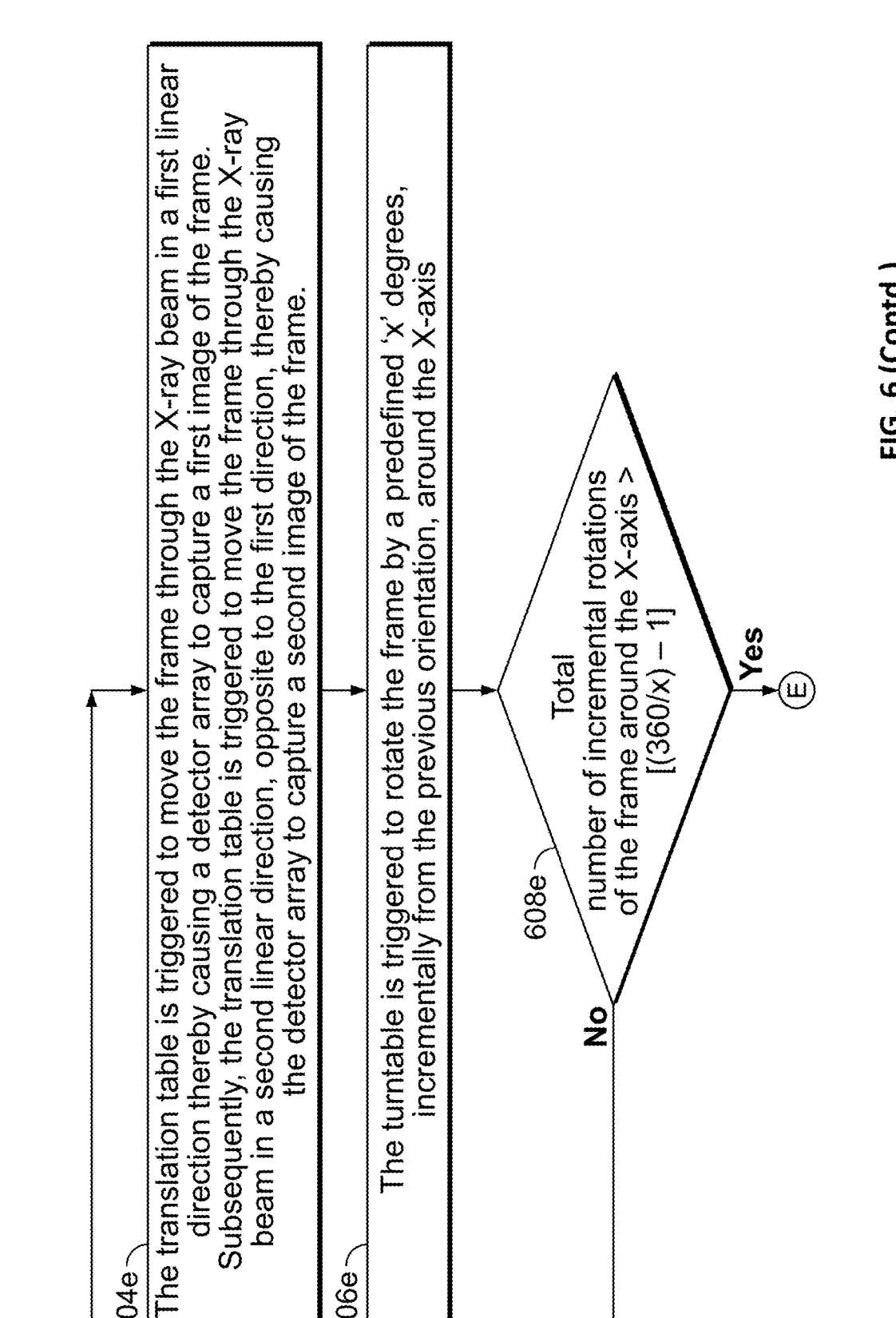

604e

The translation table is triggered to move the frame through the X-ray beam in a first linear direction thereby causing a detector array to capture a first image of the frame. Subsequently, the translation table is triggered to move the frame through the X-ray beam in a second linear direction, opposite to the first direction, thereby causing the detector array to capture a second image of the frame.

606e

The turntable is triggered to rotate the frame by a predefined 'x' degrees, incrementally from the previous orientation, around the X-axis 608e Total number of incremental rotations of the frame around the X-axis > [(360/x) − 1]

No

Yes

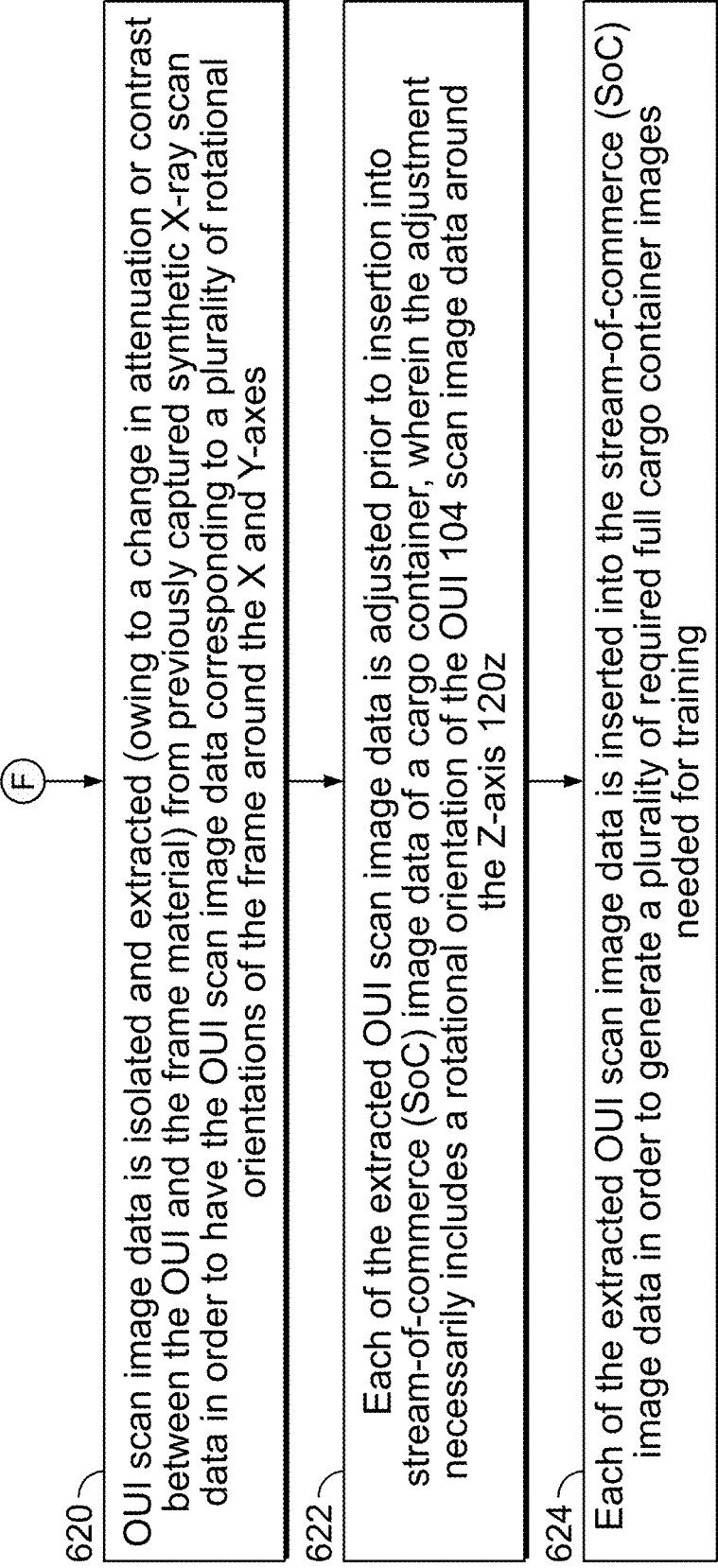

600

620 — OUI scan image data is isolated and extracted (owing to a change in attenuation or contrast between the OUI and the frame material) from previously captured synthetic X-ray scan data in order to have the OUI scan image data corresponding to a plurality of rotational orientations of the frame around the X and Y-axes 622 — Each of the extracted OUI scan image data is adjusted prior to insertion into stream-of-commerce (SoC) image data of a cargo container, wherein the adjustment necessarily includes a rotational orientation of the OUI 104 scan image data around the Z-axis 120z 624 — Each of the extracted OUI scan image data is inserted into the stream-of-commerce (SoC) image data in order to generate a plurality of required full cargo container images needed for training

SYSTEMS AND METHODS FOR AUTOMATICALLY GENERATING SYNTHETIC X-RAY SCAN DATA OF OBJECTS IN A PLURALITY OF ORIENTATIONS

CROSS-REFERENCE

The present specification relies on U.S. Patent Provisional Application No. 63/505,670, titled "Systems and Method for Automatically Generating Synthetic X-Ray Scan Data of Objects in a Plurality of Orientations", filed on Jun. 1, 2023, for priority, which is herein incorporated by reference in its entirety.

FIELD

The present specification is related generally to the field of X-ray scanning. More specifically, the present specification is related to systems and methods for generating artificial or synthetic X-ray scan data for objects that are automatically manipulated into a plurality of orientations in three-dimensional space.

BACKGROUND

In recent years there has been an increased need for tools that assist operators in their inspection of X-ray images. This is driven by the demand for higher throughput scanning systems, where the bottleneck in scanning high volumes rapidly is typically due to the image adjudication time.

Many tools, such as material classification techniques, already exist for assisting operators. However, such tools are limited in their function, require an operator to manually select buttons to display the results of the tool, and provide no definitive measure of object or material presence within the image. In order to significantly reduce the inspection time of X-ray images, targeted material detection algorithms are required. Such algorithms aim to identify the presence of specific items or groups of items based on targeted item lists.

In many cases, while the object to be identified may be a well-known, ubiquitous object, the number of real-world scans that contain examples of the object are low. To compound this problem even further, the relatively little image data representative of this very low number are not usually available for sharing outside of the customs authority where they were captured.

In addition, it is well-known that within the field of supervised machine learning, insufficient amounts of training data results in a poor approximation. An over-constrained machine learning model will underfit the relatively small training dataset, whereas an under-constrained machine learning model, in turn, will likely overfit the training data, both of which result in poor performance. Stated differently, a small amount of training or test data will result in an optimistic and high variance estimation of machine learning model performance.

In order to overcome the hurdle of insufficient training data, one option is to generate artificial or synthetic X-ray scan data of the objects to be identified. The synthetic X-ray scan data can be used in training machine learning (ML) algorithms in a number of ways, including the use of X-ray scan data as it is captured using a production system, isolation of the particular threat, and injection of a threat item into other stream-of-commerce images for subsequent training. For example, consider a weapon as a threat item. The aim is to arrive at a process that can identify the weapon within an X-ray image of a cargo container. The manifestation of such a weapon within the X-ray image will depend upon several factors, including: i) the output energy of the X-ray source used to generate the image as different X-ray energies result in differing amounts of attenuation and corresponding image pixel intensity; ii) the output dose of the X-ray source used to generate the image; iii) the relative location of the object being scanned to the source and detector array, resulting in different magnification factors and corresponding coverage of the detector array; iv) the presence of occluding materials which impact the spectral composition of the X-ray beam passing through the weapon, which, in turn, impacts the resulting intensity distribution, resolution, and overall appearance of the image; and v) the orientation of the weapon itself, because depending upon the orientation of the weapon, its intensity profile within the X-ray image will vary drastically.

In the field of low-energy X-ray baggage scanning, the effort required to build a library of synthetic X-ray scan images of a particular item is time-consuming, albeit achievable given the short scan time, the ability to readily access the machines for high throughput scanning, and the limited number of sizes/orientations/occlusions that an item can experience in small packages. However, this approach is significantly complicated in the field of cargo and vehicle inspection as the possible number of orientations and clutter quantities and material types are vast. In addition, individual threat items may potentially be placed in any orientation relative to the container within which they are located. A manual approach to taking scans, adjusting threat item orientation, and rescanning is prohibitively time consuming and labor intensive further complicated by the impact of exposure restrictions on accessibility to the equipment from one scan to another.

Accordingly, there is a need for systems and methods that fully automate (without manual intervention) the process of generating and capturing synthetic X-ray scan data of objects, positioned in a plurality of orientations with respect to a cargo container, for use in training machine learning algorithms that can be used to identify objects of interest or threat objects within an X-ray image of a cargo container.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a system for automatically generating a plurality of X-ray scan data of a cargo container embedded with an object, wherein the object is embedded in a plurality of orientations in three dimensional space within the cargo container, and wherein the three dimensional space is defined by first, second and third mutually orthogonal axes, comprising: a frame for holding the object; a base plate for supporting the frame, wherein the frame is positioned in an initial orientation with respect to the first, second and third axes; a first table for supporting the base plate; a second table for supporting the first table, wherein the second table is capable of imparting linear motion to the frame, and wherein the first table is capable of imparting rotational motion to the frame around the first axis independent of the second table; first and second robotic arms and associated cameras configured to locate and rotate the frame around the second and third axes respectively; an X-ray source for generating an X-ray beam that impinges on the frame and a detector array for capturing resultant X-ray scan data; and a computing device having a memory and a processor, wherein the computing device controls movements of the first table, second table and the first and second robotic arms, and wherein the memory stores a plurality of programmatic instructions which when executed cause the processor to: sequentially implement first, second, third, fourth and fifth set of steps in order to generate X-ray scan data corresponding to the frame; isolate and extract X-ray scan data corresponding to the object from the X-ray scan data corresponding to the frame; adjust the X-ray scan data corresponding to the object; and insert each of the adjusted X-ray scan data corresponding to the object into X-ray scan data of the cargo container in order to generate the plurality of X-ray scan data of the cargo container embedded with the object.

Optionally, the second set of steps is implemented only after completion of the first set of steps, the third set of steps is implemented only after completion of the second set of steps, and the fourth and fifth set of steps are implemented only after completion of the third set of steps. Optionally, the first set of steps includes causing the first table to incrementally rotate the frame around the first axis by a predetermined first angle until one full rotation around the first axis is completed, wherein for each unique incremental rotational orientation of the frame around the first axis, the second table moves the frame through the X-ray beam in first and second mutually opposing directions in order to generate a pair of scan image data. Optionally, the second set of steps includes causing the first robotic arm to incrementally rotate the frame around the second axis by a predetermined second angle until one full rotation around the second axis is completed, wherein for each unique incremental rotational orientation of the frame around the second axis, the first set of steps are repeated. Optionally, the third set of steps includes causing the second robotic arm to incrementally rotate the frame around the third axis by a predetermined third angle until one full rotation around the third axis is completed, wherein for each unique incremental rotational orientation of the frame around the third axis, the first set of steps are repeated. Optionally, the fifth set of steps includes causing the first table to incrementally rotate the frame around the second axis by the predetermined second angle until one full rotation around the second axis is completed, wherein for each unique incremental rotational orientation of the frame around the second axis, the second table moves the frame through the X-ray beam in first and second mutually opposing directions in order to generate a pair of scan image data. Optionally, the fourth set of steps includes causing the second robotic arm to incrementally rotate the frame around the third axis by the predetermined third angle until one full rotation around the third axis is completed, wherein for each unique incremental rotational orientation of the frame around the third axis, the fifth set of steps are repeated. Optionally, each of the first, second and third angles is the same. Optionally, each of the first, second and third angles is 15 degrees. Optionally, each of the first, second and third angles ranges from 1 to 90 degrees.

Optionally, the frame is positioned at a first height of a plurality of predefined heights in order to generate the X-ray scan data corresponding to the frame. Optionally, the frame is positioned at a second height of the plurality of predefined heights and the first, second, third, fourth and fifth set of steps are sequentially implemented again in order to generate another set of X-ray scan data corresponding to the frame at the second height.

Optionally, adjustment of the X-ray scan data corresponding to the object comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container.

Optionally, a shape of the frame is one of spherical, cubical, regular polygon or a cylindrical tube with or without hemispherical ends.

Optionally, the frame is made from polystyrene.

Optionally, each of a plurality of scintillating crystals of the detector array has different vertical and horizontal crystal resolutions.

The present application also discloses a system for automatically generating a plurality of X-ray scan data of a cargo container embedded with an object, wherein the object is embedded in a plurality of orientations in three dimensional space within the cargo container, and wherein the three dimensional space is defined by first, second and third mutually orthogonal axes, comprising: a frame for holding the object; a base plate for supporting the frame, wherein the frame is positioned in an initial orientation with respect to the first, second and third axes; a first table for supporting the base plate; a second table for supporting the first table, wherein the second table is capable of imparting linear motion to the frame, and wherein the first table is capable of imparting rotational motion to the frame around the first axis independent of the second table; a robotic arm and associated camera configured to locate and rotate the frame around the second axis; an X-ray source for generating an X-ray beam that impinges on the frame and a detector array for capturing resultant X-ray scan data; and a computing device having a memory and a processor, wherein the computing device controls movements of the first table, second table and the robotic arm, and wherein the memory stores a plurality of programmatic instructions which when executed cause the processor to: sequentially implement first and second set of steps in order to generate X-ray scan data corresponding to the frame; isolate and extract X-ray scan data corresponding to the object from the X-ray scan data corresponding to the frame; adjust the X-ray scan data corresponding to the object; and insert each of the adjusted X-ray scan data corresponding to the object into X-ray scan data of the cargo container in order to generate the plurality of X-ray scan data of the cargo container embedded with the object.

Optionally, the second set of steps is implemented only after completion of the first set of steps. Optionally, the first set of steps includes causing the first table to incrementally rotate the frame around the first axis by a predetermined first angle until one full rotation around the first axis is completed, wherein for each unique incremental rotational orientation of the frame around the first axis, the second table moves the frame through the X-ray beam in first and second mutually opposing directions in order to generate a pair of scan image data. Optionally, the second set of steps includes causing the robotic arm to incrementally rotate the frame around the second axis by a predetermined second angle until one full rotation around the second axis is completed, wherein for each unique incremental rotational orientation of the frame around the second axis, the first set of steps are repeated. Optionally, adjustment of the X-ray scan data corresponding to the object includes incrementally rotating the X-ray scan data corresponding to the object around the third axis by a predefined third angle. Optionally, adjustment of the X-ray scan data corresponding to the object further comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container. Optionally, each of the first, second and third angles is the same. Optionally, each of the first, second and third angles is 15 degrees. Optionally, each of the first, second and third angles ranges from 1 to 90 degrees.

Optionally, a shape of the frame is one of spherical, cubical, regular polygon or a cylindrical tube with or without hemispherical ends.

Optionally, the frame is made from polystyrene.

Optionally, each of a plurality of scintillating crystals of the detector array has similar vertical and horizontal crystal resolutions.

The present specification also discloses a method for automatically generating a plurality of X-ray scan data of a cargo container embedded with an object, wherein the object is embedded in a plurality of orientations in three dimensional space within the cargo container, wherein the three dimensional space is defined by first, second and third mutually orthogonal axes, wherein the object is held in a frame supported on a base plate, wherein the base plate is supported on a first table, wherein the first table is supported on a second table such that the second table is capable of imparting linear motion to the frame and the first table is capable of imparting rotational motion to the frame around the first axis independent of the second table, and wherein a robotic arm and associated camera is configured to locate and rotate the frame around the second axis, the method comprising: executing a first set of steps, wherein the first set of steps include causing the first table to incrementally rotate the frame around the first axis by a predetermined first angle until one full rotation around the first axis is completed, and wherein for each unique incremental rotational orientation of the frame around the first axis the second table moves the frame through the X-ray beam in first and second mutually opposing directions in order to generate a pair of scan image data; executing a second set of steps after completion of the first set of steps, wherein the second set of steps include causing the robotic arm to incrementally rotate the frame around the second axis by a predetermined second angle until one full rotation around the second axis is completed, wherein for each unique incremental rotational orientation of the frame around the second axis the first set of steps are repeated, and wherein execution of the first and second set of steps results in generation of X-ray scan data corresponding to the frame; isolating and extracting X-ray scan data corresponding to the object from the X-ray scan data corresponding to the frame; adjusting the X-ray scan data corresponding to the object; and inserting each of the adjusted X-ray scan data corresponding to the object into X-ray scan data of the cargo container in order to generate the plurality of X-ray scan data of the cargo container embedded with the object.

Optionally, adjustment of the X-ray scan data corresponding to the object includes incrementally rotating the X-ray scan data corresponding to the object around the third axis by a predefined third angle. Optionally, adjustment of the X-ray scan data corresponding to the object further comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container. Optionally, each of the first, second and third angles is the same. Optionally, each of the first, second and third angles is 15 degrees. Optionally, each of the first, second and third angles ranges from 1 to 90 degrees.

Optionally, a shape of the frame is one of spherical, cubical, regular polygon or a cylindrical tube with or without hemispherical ends.

Optionally, the frame is made from polystyrene.

Optionally, each of a plurality of scintillating crystals of the detector array has similar vertical and horizontal crystal resolutions.

The present specification also discloses a system for automatically generating a plurality of X-ray scan data of a cargo container embedded with an object, wherein the object is embedded in a plurality of orientations in three dimensional space within the cargo container, comprising: a frame for holding the object; a base plate for supporting the frame, wherein the frame is positioned in an initial orientation with respect to a vertical axis; a first table for supporting the base plate; a second table for supporting the first table, wherein the second table is capable of imparting linear motion to the frame, and wherein the first table is capable of imparting rotational motion to the frame around the vertical axis independent of the second table; an X-ray source for generating an X-ray beam that impinges on the frame and a detector array for capturing resultant X-ray scan data; and a computing device having a memory and a processor, wherein the computing device controls movements of the first table and second table, and wherein the memory stores a plurality of programmatic instructions which when executed cause the processor to: capture X-ray scan data corresponding to the frame by triggering the first table to incrementally rotate the frame around the vertical axis by a predetermined angle until one full rotation around the vertical axis is completed, and wherein for each unique incremental rotational orientation of the frame around the vertical axis the second table moves the frame through the X-ray beam in first and second mutually opposing directions in order to generate a pair of scan image data; isolate and extract X-ray scan data corresponding to the object from the X-ray scan data corresponding to the frame; adjust the X-ray scan data corresponding to the object; and insert each of the adjusted X-ray scan data corresponding to the object into X-ray scan data of the cargo container in order to generate the plurality of X-ray scan data of the cargo container embedded with the object.

Optionally, the object is a bulk cargo item.

Optionally, adjustment of the X-ray scan data corresponding to the object comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container.

Optionally, the predefined angle is 15 degrees.

Optionally, the predefined angles range from 1 to 90 degrees.

Optionally, a shape of the frame is one of spherical, cubical, regular polygon or a cylindrical tube with or without hemispherical ends.

Optionally, the frame is made from polystyrene.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 6 is a flowchart showing a plurality of exemplary steps of a method of generating synthetic X-ray scan data of an OUI for training, in accordance with some embodiments of the present specification.

DETAILED DESCRIPTION

Figure 1A:
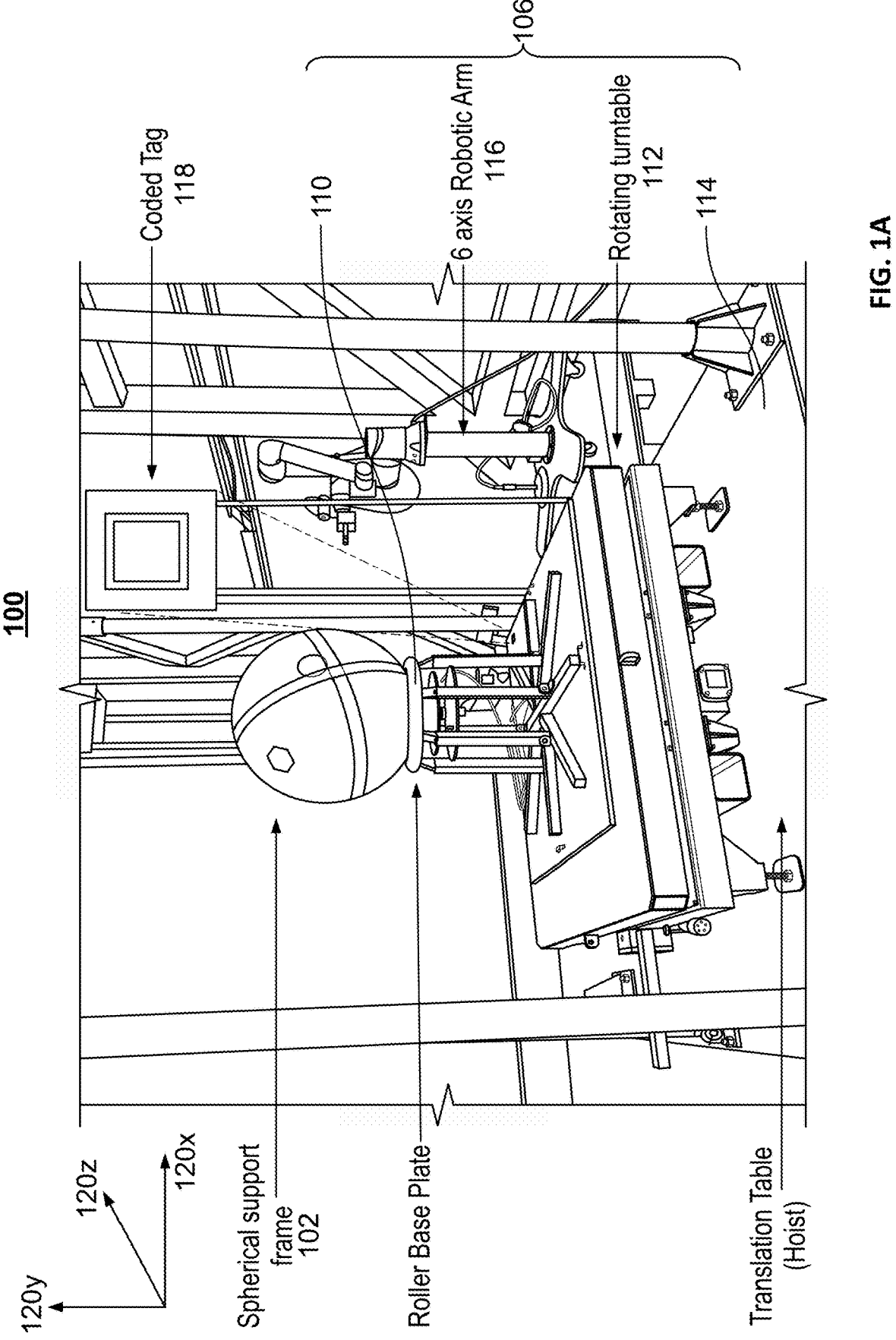
FIG. 1A shows an assembled view of a system for automatically generating synthetic X-ray scan data of targeted objects under investigation (OUI) or threat items, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Figure 1B:
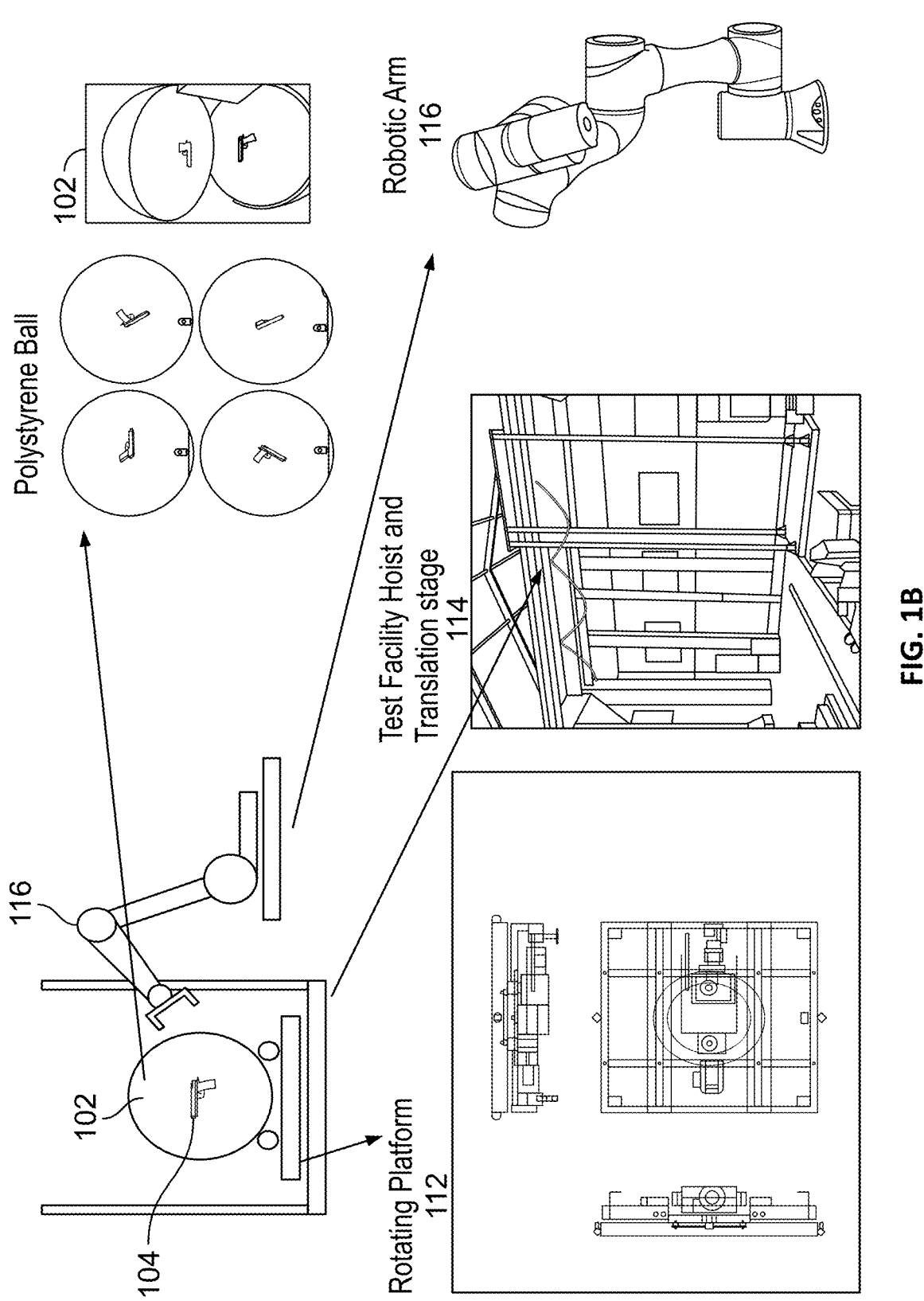
FIG. 1B is a disassembled view of various components of the system of FIG. 1A, in accordance with some embodiments of the present specification.

FIG. 1A shows an assembled view of a system 100 that is configured to enable automated generation of synthetic X-ray scan data of targeted objects under investigation (OUI) or threat items, while FIG. 1B is a disassembled, exploded view of various components of the system 100, in accordance with some embodiments of the present specification. In some embodiments, the synthetic X-ray scan data is used for training one or more machine learning models. Alternatively, in some embodiments, the synthetic X-ray scan data is used for training operators of X-ray scanners. In accordance with aspects of the present specification, the system 100 enables fully automated generation and capture of synthetic X-ray scan data of targeted threat items in a plurality of orientations, based on any X-ray source and detector configuration and at any dose output.

In some embodiments, the system 100 comprises a frame 102 for holding or supporting an OUI 104, wherein the frame 102 is amenable to be physically manipulated, and a maneuvering sub-system 106 configured to manipulate or move (that is, lift, rotate and translate) the frame 102 (and hence, the OUI 104 held or supported by the frame 102) in three-dimensional space. The system 100 is in data communication with at least one computing device such that the computing device controls movements of the maneuvering sub-system 106. In embodiments, the at least one computing device includes a module, engine or application which, when executed, is configured to control and instruct the maneuvering sub-system 106 to manipulate or move the frame 102 in a predefined order or sequence in order to enable generation and capture of the synthetic X-ray scan data.

For generation and capture of synthetic X-ray scan data, an X-ray radiation source is triggered to cause an X-ray beam to impinge upon the frame 102 (which holds the OUI 104) and an array of detectors is configured to capture a scan image. In some embodiments, the X-ray radiation source and the array of detectors are positioned at a fixed height, wherein the X-ray radiation source is treated as a point source. The frame 102 is manipulated into a plurality of orientations (relative to the X-ray radiation source and array of detectors) in order to generate and capture synthetic X-ray scan data corresponding to each of the plurality of orientations. In some embodiments, the synthetic X-ray scan data corresponds to low and high energies of the radiation source.

It should be appreciated that manifestation of the OUI 104 within the synthetic X-ray scan data will depend upon several factors, including, in some embodiments: i) the output energy of the X-ray radiation source; ii) the output dose of the X-ray radiation source; iii) the relative location of the OUI 104 to the source and detector array; iv) the presence of occluding materials; and v) the orientation of the OUI 104, which are each described in turn below.

The output energy of the X-ray radiation source will determine the attenuation of the OUI 104 in the X-ray beam because the attenuation coefficient changes with energy, and this will determine the greyscale of the OUI 104 in the synthetic scan image. X-ray scanning systems can vary in energy, however 2.5, 3.0, 4.0, 6.0 and 9.0 MeV X-ray beams are widely used and need to be accounted for while generating and capturing the synthetic X-ray scan data. Accordingly, in various embodiments, different X-ray radiation sources are used to generate and capture synthetic X-ray scan data.

The output dose of the X-ray radiation source varies depending on the X-ray scanning system and its specifications. For example, low-dose X-ray scanning systems may have a dosage on the order of 7 rads/min while a high-dose X-ray scanning systems may have a dosage on the order of 200 rads/min. These output dose variations are correlated with a change in the X-ray yields or outputs. A greater number of X-rays means higher counts/statistics which reduces the standard deviation (noise levels) in the synthetic X-ray scan data, which, in turn, provides better contrast. Accordingly, in various embodiments, a dose varying X-ray radiation source is used to generate and capture synthetic X-ray scan data.

The distance of the OUI 104 relative to detectors/source provides slightly different points-of-view. To simulate varying distances of the OUI 104, relative to the detectors/source, a translation table 114 (described below) is configured to move the OUI 104 between the source and the detectors. Additionally, in some embodiments, a rotating table 110 (described below) is also configured to be manually moved on the translation table 114 in order to vary the distance of the OUI 104 relative to the detectors/source while generating and capturing synthetic X-ray scan data.

In embodiments, frame 102 is configured, as discussed below, to account for the presence of occluding materials while generating and capturing synthetic X-ray scan data. In addition, different orientations of the OUI 104 are simulated by implementing method 600 (FIG. 6).

Frame 102

In order to generate synthetic X-ray scan data, it is required that the OUI 104 is held or supported by the frame 102 so as to enable scanning/imaging of the OUI 104 at a plurality of orientations with respect to an incoming X-ray beam in order to mimic or represent a myriad of orientations that the OUI 104 may be positioned within a cargo container. The frame 102 holds or supports the OUI 104 in such a way that rotational manipulation of the frame 102 results in a corresponding and equivalent rotation manipulation of the OUI 104. Additionally, the frame 102 is designed to enable generation of scan images with a clear and distinct boundary between the OUI 104 and the surrounding medium. This is required for a subsequent OUI 104 extraction process which is based on determining the edges of the OUI 104 relative to the background, prior to extraction, in the scan images.

Figure 2:
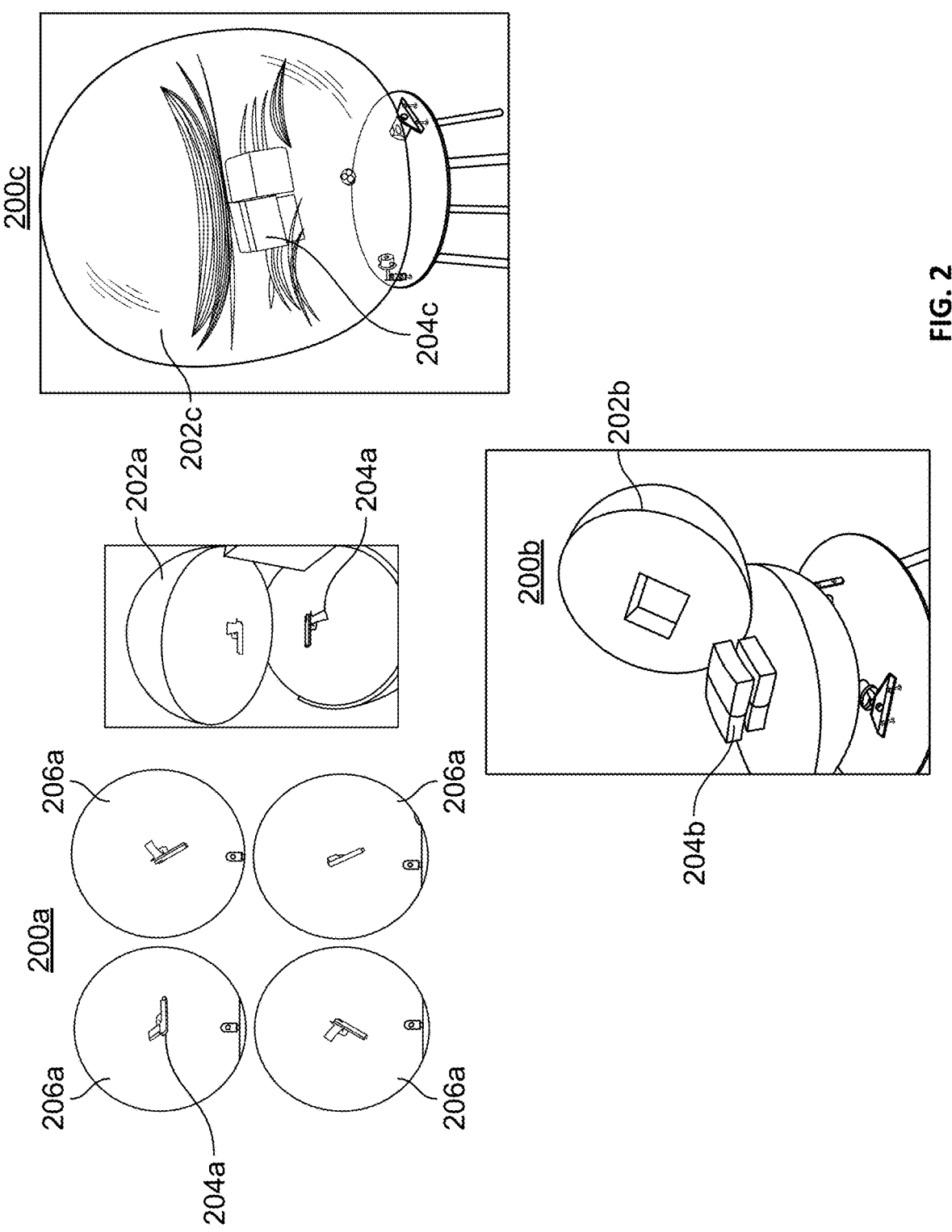
FIG. 2 shows a plurality of views of a frame holding an object, in accordance with some embodiments of the present specification.

In some embodiments, the frame 102 is a shaped holder or block fabricated from a low-density material. It is desirable that for any orientation, the frame 102 must not introduce artifacts into the scan images that will hinder or prevent the extraction process. It is further desirable that the shape of the frame 102 is designed such that it has rotational symmetry in three-dimensional space in order to enable a simple synthetic data capture routine with minimal modifications required between scans and no manual intervention. In some embodiments, the shape of the frame 102 is spherical since a sphere provides full 360-degree orientations (and rotational symmetry) in all axes in three-dimensional space. In alternate embodiments, the shape of the frame 102 is cubical, regular polygonal (that is, a polygon having equal sides and angles) or a cylindrical tube with or without hemispherical ends. It is preferred that the shape of the frame 102 be such that it has minimal edges/angles as these may show up as artifacts in the scan images. FIG. 2 shows a first view 200a wherein a first spherical shaped frame 202a holds or supports a gun 204a, a second view 200b wherein a second spherical shaped frame 202b holds or supports a drug package 204b and a third view 200c wherein a third 'zorb' shaped frame 202c holds or supports another package 204c. The view 200a also shows X-ray scan images 206a of the frame 202a in multiple orientations.

In some embodiments, frame 102 is fabricated from and/or filled with a low density material, with the exception of a hollow opening (such as but not limited to a channel or tunnel) that is preferably positioned proximal to a center of frame 102, where the hollow opening is shaped and configured for placement of OUI 104. In embodiments, the material of the frame 102 should have the following characteristics: 1) the material should have a low density that conveys a low level of X-ray attenuation; preferably, the attenuation conveyed by the frame 102 is no larger than any attenuation conveyed by any part of the OUI 104 being imaged within the frame 102, and 2) the material should be uniformly distributed in order to provide a smooth X-ray attenuation signal. In some embodiments, the uniformity of the material is such that a standard deviation of the X-ray attenuation signal across the entire area of the frame 102 in the scan images ranges from 0 to 5%. Any material that results in lines/sharp edges has the potential to impact the edge detection and extraction of the OUI 104. Consequently, solid materials are preferred over flexible, malleable materials. FIGS. 1A and 1B show the frame 102 configured in the form of a sphere that is fabricated from polystyrene, in accordance with some embodiments of the present specification. As shown in FIG. 2, the first spherical frame 202a and second spherical frame 202b are both made from polystyrene. The third frame 202c is fabricated using a less preferred flexible and malleable material compared to the more solid polystyrene. Thus, in some embodiments, the OUI 104 is held in a spherical support frame 102 designed to provide minimum, uniform attenuation of X-rays such that the OUI 104 can be easily isolated from the X-ray scan images while allowing for case of rotation around any axis in three-dimensional space.

It should be noted that the material of the frame 102 should not possess any of the following characteristics: 1) the material should not have high density that occludes the OUI 104 to a point that limits the resolution that can be achieved of the target material or OUI 104 and 2) the material should not have high atomic number (Z). Materials of high density and/or high Z are typically heavy, and therefore difficult to manipulate (lift, rotate and translate).

In an alternate embodiment, at least one tensioned wire is used to suspend the OUI 104 in air. In another alternate embodiment, the OUI 104 is held in place by being sandwiched between two parallel surfaces, which, in an embodiment are low-density sheets. The two parallel surfaces, holding the OUI 104, are in turn held in place by the frame 102 or the at least one tensioned wire. In yet another alternate embodiment, the OUI 104 is shrink wrapped in a plastic sheet thereby generating a partial vacuum. The shrink wrapped OUI 104 is in turn held in place by the frame 102 or the at least one tensioned wire.

Maneuvering Sub-System 106

Referring back to FIGS. 1A and 1B, in order to generate sufficient synthetic X-ray scan data, while being held or supported by frame 102, the OUI 104 needs to be manipulated by the sub-system 106 so as to enable scanning/imaging of the OUI 104 at a plurality of orientations with respect to an incoming X-ray beam. In some embodiments, the sub-system 106 comprises a roller base plate 110 which in turn is fixed onto a rotating turntable 112. The frame 102 is positioned on the roller base plate 110. The rotating turntable 112 is further fixed on a translation table or hoist 114. The sub-system 106 further includes at least one multi-axis robotic arm and camera assembly 116.

In some embodiments, the rotating turntable 112 includes one or more proximity and positional sensors to track the rotational position of the turntable 112 in order to ensure accurate positioning between scans.

The rotating turntable 112, when actuated, is configured to enable automated rotation of the roller base plate 110 and hence the frame 102, and therefore OUI 104 held in the frame 102, around, for example, the Y-axis $120_y$ independent of the translation table or hoist 114. Rotation of the frame 102 (and hence the OUI 104 held in the frame 102) around, for example the X-axis $120_x$ is enabled using the at least one multi-axis robotic arm and camera assembly 116 which is configured to position itself onto the frame 102 at a known location, through the identification of one or more coded tags 118 also positioned on the frame 102, prior to performing the rotation, which proceeds on the roller base plate 110. In various embodiments, the coded tag may be positioned on either one or both of frame 102 and the rotating turntable 112. In various embodiments, a coded tag is configured to enable the multi-axis robotic arm 116 to consistently locate to a common position on a variety of support structure shapes and dimensions to ensure consistent reorientation from one scan to the next. Having the coded tags 118 as a datum point to which all orientations can be measured from, provides an indication as to which specific orientation has been scanned. The availability of such an indication prevents time-consuming repetition of the orientation measurement processes and provides a point of reference in case of breakdowns through the automated procedure.

In some embodiments, when the scintillating crystals in the detector array have distinctly different vertical and horizontal crystal resolutions (that is, the scintillating crystals have rectangular cross-sections), rotation of the frame 102 (and hence the OUI 104 held in the frame 102) around, for example, the Z-axis $120_z$ is enabled using the at least one multi-axis robotic arm and camera assembly 116 (that may be moved or re-oriented for rotating the frame 102 around the Z-axis $120_z$) or another multi-axis robotic arm and camera assembly. In some embodiments, when the scintillating crystals in the detector array have substantially similar vertical and horizontal crystal resolutions (that is, the scintillating crystals have square cross-sections), the scan image data of the OUI 104 is rotated incrementally by 'z' degrees of rotation around the Z-axis $120_z$ prior to inserting the scan image data of the OUI 104 into a stream of commerce images for training.

In some embodiments, for each rotational orientation of the frame 102, the translation table 114 moves the frame 102 (and hence the OUI 104 held in the frame 102) through the X-ray beam at each of a plurality of predefined heights of the frame 102 (and hence the OUI 104 held in the frame 102), a predefined range of X-ray source to detector distances, and at a predefined configurable speed to match the X-ray source pulse frequency. It should be appreciated that the predefined range of X-ray source to detector distances and the predefined configurable speed is dependent on the geometry and functionality of an actual X-ray scanning system being used to generate the synthetic X-ray scan data.

In a non-limiting example, the plurality of heights includes at least first and second heights, wherein the first height corresponds to half height and the second height corresponds to quarter height (the half height and quarter height being the target heights for American National Standards Institute (ANSI) N42.46 testing). In some embodiments, it is preferred that a full set of synthetic X-ray scan data (corresponding to a plurality of rotation orientations of the frame 102) be generated and acquired at each of the plurality of pre-defined heights. That is, for example, a first full set of synthetic X-ray scan data be generated and acquired at a first height of the frame 102, a second full set of synthetic X-ray scan data be generated and acquired at a second height of the frame 102, and so on depending upon the number of different heights of the plurality of heights.

In some embodiments, the frame 102 (and hence the OUI 104 held in the frame 102) is positioned in each of the plurality of predefined heights by moving the translation table 114 vertically up and down.

In some embodiments, for each rotational orientation of the frame 102, the translation table 114 moves the frame 102 (and hence the OUI 104 held in the frame 102) through the X-ray beam in a first direction and then in a second direction (opposite to the first) in order to capture a pair of synthetic X-ray scan data.

Also, moving the frame 102 (and hence the OUI 104 held in the frame 102) to a plurality of heights, wherein for each of the plurality of heights a full set of synthetic X-ray scan data (corresponding to a plurality of rotation orientations of the frame 102) is generated and acquired, provides different point-of-view images and, therefore, further orientations.

Method of Generating Synthetic X-Ray Scan Data

FIG. 6 is a flowchart of a plurality of exemplary steps of a method 600 for generating synthetic X-ray scan data of the OUI 104 for training, in accordance with some embodiments of the present specification. In embodiments, the method 600, when executed by the at least one computing device in data communication with the system 100 of FIGS. 1A and 1B, is configured to cause manipulation of the frame 102 (and hence the OUI 104 held or supported by the frame 102) and subsequent scanning in a predetermined sequence of operations in order to generate synthetic X-ray scan data. In some embodiments, the method 600 of FIG. 6 is directed towards generating synthetic X-ray scan data of objects that are non-bulk cargo items such as, but not limited to, weapons, drugs, small packages, currency, explosives and other contraband evident to persons of ordinary skill in the art. It should be noted that each of the components described herein are configured to perform the respective actions via, in some embodiments, implementation of a plurality of instructions or programmatic code within hardware, firmware, software or any combination thereof. For example, the multi-axis robotic arm is configured such that it positions onto the frame 102 and such that it is triggered to rotate the frame 102 by a predefined number of degrees, incrementally from the previous orientation.

Referring now to FIGS. 1A, 1B and 6, in some embodiments, the method 600 is initiated by executing a first set of steps 602a to 610a in order to generate and capture synthetic X-ray scan data corresponding to a plurality of rotational orientations of the frame 102 around a first axis, which, in an example is the Y-axis 120y. In some embodiments, prior to initiating the first set of steps 602a to 610a, the translation table 114 is triggered (configured through a PLC command from the at least one computing device) to move vertically upwards or downwards in order to position the frame 102 (and hence the OUI 104 held in the frame 102) at a first height of a plurality of predefined heights.

First Set of Steps

At step 602a, the frame 102 (and hence the OUI 104 held in the frame 102) is placed in a first rotational orientation on the roller base plate 110 that is fixedly attached to the turntable 112. In some embodiments, the first rotational orientation corresponds to a 0-degree orientation for rotation around the Y-axis 120y. In some embodiments, the first rotational orientation also corresponds to a 0-degree orientation for rotation around the X-axis 120x and Z-axis 120z. Thus, the coordinates for a first rotational position begin at (0, 0, 0).

At step 604a, the translation table 114 is triggered (configured through a PLC command from the at least one computing device) to move the frame 102 through the X-ray beam in a first linear direction, wherein a detector array is configured to capture a first image of the frame 102. Subsequently, the translation table 114 is triggered and thus configured to move the frame 102 through the X-ray beam in a second linear direction, opposite to the first direction, wherein the detector array is configured to capture a second image of the frame 101. That is, for an orientation of the frame 102 (and hence of the OUI 104) two X-ray scan images are captured.

At step 606a, the turntable 112 is triggered to rotate the frame 102 by a predefined 'y' degrees, incrementally from the previous orientation, around the Y-axis 120y.

At step 608a, it is determined if the total number of incremental rotations $n_y$ of the frame 102 around the Y-axis 120y is greater than $[(360/y)-1]$, where 'y' is the predefined incremental degrees of rotation. In various embodiments, 'y' ranges from 1 to 90 degrees. In a non-limiting example, 'y' is 15 degrees. Therefore, the total number of incremental rotations $n_y=[(360/15)-1]=23$. It should be appreciated that in this example the frame 102 is rotated for a total of $23+1=24$ incremental rotations including the first rotational orientation (corresponding to the 0 degrees orientation).

If $n_y \leq [(360/y)-1]$ then, flow moves back to step 604a and the translation movements of step 604a are repeated in order to capture another set of two X-ray scan images. Thereafter, the flow moves to step 606a for a next incremental rotation of the frame 102.

Figure 3:
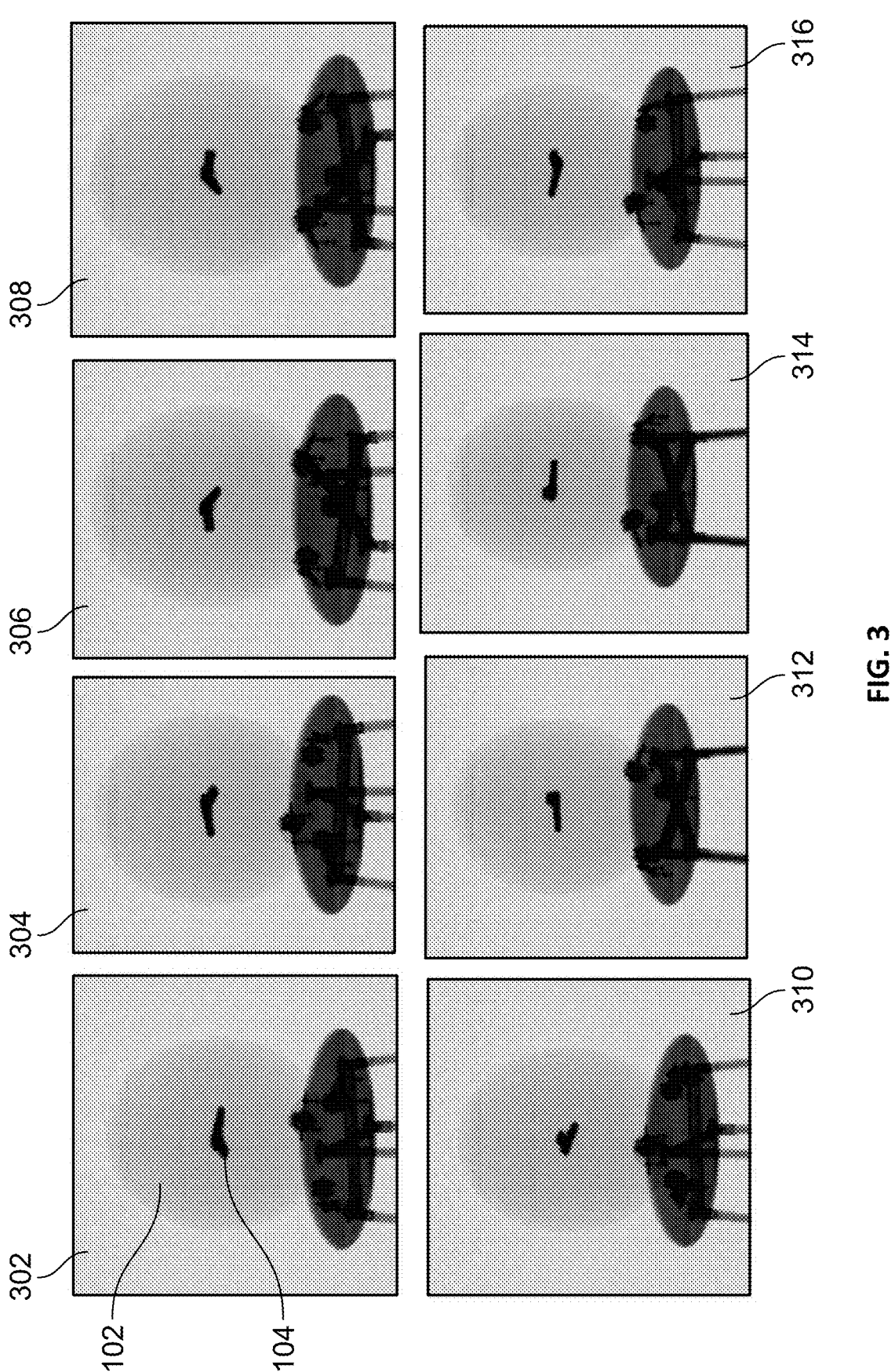
FIG. 3 shows a plurality of X-ray scan images of the frame holding a gun in a plurality of rotational orientations around the Y-axis, in accordance with some embodiments of the present specification.

FIG. 3 shows a first scan image 302, a second scan image 304, a third scan image 306, a fourth scan image 308, a fifth scan image 310, a sixth scan image 312, a seventh scan image 314, and an eighth scan image 316 of the frame 102 holding OUI 104, which in this case, is a gun, in a plurality of rotational orientations around the Y-axis 120y (FIG. 1A). The X-ray scan images 302, 304, 306, 308, 310, 312, 314, 316 are a subset of the synthetic X-ray scan data of the OUI 104 generated by implementing the first set of steps of the method 600.

If $n_y > [(360/y)-1]$ then, the method 600 moves on to execute a second set of steps 602b and 604b in order to generate and capture synthetic X-ray scan data corresponding to a plurality of rotational orientations of the frame 102 around a second axis, for example, the X-axis 120x.

Second Set of Steps

At the start of the second set of steps (that is, at the end of the first set of steps), the frame 102 (and hence the OUI 104 held in the frame 102) is automatically positioned back to the first rotational orientation on the roller base plate 110 due to the final incremental rotation of the first set of steps. In some embodiments, the first rotational orientation corresponds to a 0-degree orientation for rotation around the X-axis 120x. It should be appreciated that, in some embodiments, there is no need to capture first and second images of the frame 102 in the first rotational orientation with the frame 102 being moved in first and second linear directions, at this stage. This is because a pair of scan images in the first rotational orientation of the frame 102 has already been captured in step 604a.

Consequently, at step 602b, the multi-axis robotic arm 116 is positioned onto the frame 102 and is triggered to rotate the frame 102 by a predefined 'x' degrees, incrementally from the previous orientation, around the X-axis 120x.

At step 604b, it is determined if the total number of incremental rotations $n_x$ of the frame 102 around the X-axis 120x is greater than $[(360/x)-1]$, where 'x' is the predefined incremental degrees of rotation. In various embodiments, 'x' ranges from 1 to 90 degrees. In a non-limiting example, 'x' is 15 degrees. Therefore, the total number of incremental rotations $n_x = [(360/15)-1] = 23$. It should be appreciated that the total number of incremental rotations $n_x$ is 23 and not 24 since, in the final incremental rotation around the X-axis, the frame 102 is again positioned in the first rotational orientation on the roller base plate 110.

If $n_x \leq [(360/x)-1]$ then, the flow moves back to step 604a in order to execute the first set of steps resulting in scanning of the frame 102 for a plurality of 'y' degrees of incremental rotations around the Y-axis 120$_y$ for the 'x' degrees of incremental rotation around the X-axis 120$_x$. Thus, the frame 102 is scanned at incremental rotations of 'y' degrees around the Y-axis 120$_y$ for each incremental rotation of 'x' degrees around the X-axis 120$_x$.

If $n_x \leq [(360/x)-1]$ then, the method 600 moves on to execute either third, fourth and fifth set of steps or moves on to execute only a sixth set of steps 620 to 624 in order to generate and capture synthetic X-ray scan data corresponding to a plurality of rotational orientations of the frame 102 around a third axis, for example, the Z-axis 120$_z$.

Third Set of Steps

In some embodiments, the method 600 is configured to implement the third, fourth and fifth sets of steps (instead of the sixth set of steps) when the scintillating crystals, in the detector array, have distinctly different vertical and horizontal crystal resolutions (that is, the scintillating crystals have rectangular cross-sections).

At the start of the third set of steps (that is, at the end of the second set of steps), the frame 102 (and hence the OUI 104 held in the frame 102) is positioned automatically back in the first rotational orientation on the roller base plate 110 due to the final incremental rotation of the second set of steps. In some embodiments, the first rotational orientation also corresponds to a 0-degree orientation for rotation around the Z-axis 120$_z$.

It should be appreciated that, in some embodiments, there is no need to capture first and second images of the frame 102 in the first rotational orientation with the frame 102 being moved in first and second linear directions. This is because a pair of scan images in the first rotational orientation of the frame 102 has already been captured in step 604a.

Consequently, at step 602c, the multi-axis robotic arm 116 (or a second multi-axis robotic arm) is positioned onto the frame 102 and is triggered to rotate the frame 102 by a predefined 'z' degrees, incrementally from the previous orientation, around the Z-axis 120$_z$.

At step 604c, it is determined if the total number of incremental rotations $n_z$ of the frame 102 around the Z-axis 120$_z$ is greater than $[(360/z)-1]$, where 'z' is the predefined incremental degrees of rotation. In various embodiments, 'z' ranges from 1 to 90 degrees. In a non-limiting example, 'z' is 15 degrees. Therefore, the total number of incremental rotations $n_z = [(360/15)-1] = 23$. It should be appreciated that the total number of incremental rotations $n_z$ is 23 and not 24 since, in the final incremental rotation around the Z-axis, the frame 102 is again positioned in the first rotational orientation on the roller base plate 110.

If $n_z \leq [(360/z)-1]$ then, at step 606c, the first set of steps 604a through 608a are executed until the total number of incremental rotations of the frame around the Y-axis $\leq [(360/y)-1]$. However, when it is determined that the total number of incremental rotations of the frame around the Y-axis$>$ $[(360/y)-1]$ the flow moves back to step 602c for a next 'z' degrees of incremental rotation around the Z-axis 120$_z$.

Thus, the frame 102 is scanned at incremental rotations of 'y' degrees around the Y-axis 120$_y$ for each incremental rotation of 'z' degrees around the Z-axis 120$_z$.

If $n_z > [(360/z)-1]$ then, the method 600 moves on to execute the fourth and fifth set of steps in order to generate and capture synthetic X-ray scan data corresponding to a plurality of rotational orientations of the frame 102 around the third axis, for example, the Z-axis 120$_z$.

Fourth Set of Steps

At the start of the fourth set of steps (that is, at the end of the third set of steps), the frame 102 (and hence the OUI 104 held in the frame 102) is positioned automatically back in the first rotational orientation on the roller base plate 110 due to the final incremental rotation of the third set of steps. In some embodiments, the first rotational orientation also corresponds to a 0-degree orientation for rotation around the Z-axis 120$_z$.

It should be appreciated that, in some embodiments, there is no need to capture first and second images of the frame 102 in the first rotational orientation with the frame 102 being moved in first and second linear directions. This is because a pair of scan images in the first rotational orientation of the frame 102 has already been captured in step 604a.

Consequently, at step 602d, the multi-axis robotic arm 116 (or another multi-axis robotic arm) is positioned onto the frame 102 and is triggered to rotate the frame 102 by a predefined 'z' degrees, incrementally from the previous orientation, around the Z-axis 120$_z$.

At step 604d, it is determined if the total number of incremental rotations $n_z$ of the frame 102 around the Z-axis 120$_z$ is greater than $[(360/2)-1]$, where 'z' is the predefined incremental degrees of rotation. In various embodiments, 'z' ranges from 1 to 90 degrees. In a non-limiting example, 'z' is 15 degrees. Therefore, the total number of incremental rotations $n_z = [(360/15)-1] = 23$. It should be appreciated that the total number of incremental rotations $n_z$ is 23 and not 24 since, in the final incremental rotation around the Z-axis, the frame 102 is again positioned in the first rotational orientation on the roller base plate 110.

If $n_z \leq [(360/z)-1]$ then, at step 606d, the fifth set of steps 604e through 608e are executed until the total number of incremental rotations of the frame around the X-axis $\leq [(360/x)-1]$. However, when it is determined that the total number of incremental rotations of the frame around the X-axis$>$ $[(360/x)-1]$ the flow moves back to step 602d for a next 'z' degrees of incremental rotation around the Z-axis 120$_z$. Thus, the frame 102 is scanned at incremental rotations of 'x' degrees around the X-axis 120$_x$ for each incremental rotation of 'z' degrees around the Z-axis 120$_z$.

If $n_z > [(360/z)-1]$ then the method 600 moves on to execute steps 610d to 614d, as follows:

At step 610d, OUI 104 scan image data is extracted (owing to a change in attenuation or contrast between the OUI 104 and the frame 102 material) from the captured synthetic X-ray scan data in order to isolate the OUI 104 scan image data corresponding to a plurality of rotational orientations of the frame 102 around the X, Y and Z-axes. In some embodiments, the OUI 104 scan image data is isolated and extracted using a combination of intensity thresholding and bilateral filtering (a bilateral filter being a non-linear, edge-preserving, and noise-reducing smoothing filter for images that replaces the intensity of each pixel with a weighted average of intensity values from nearby pixels wherein the weight may be based on a Gaussian distribution) or edge-enhancement filtering (edge enhancement being an image processing filter that enhances the edge contrast of an image or video in an attempt to improve its acutance). Thus, the OUI 104 scan image data is extracted based on determining the edges of the OUI 104 scan image relative to the surrounding background scan image of the frame 102, prior to extraction.

Figure 4:
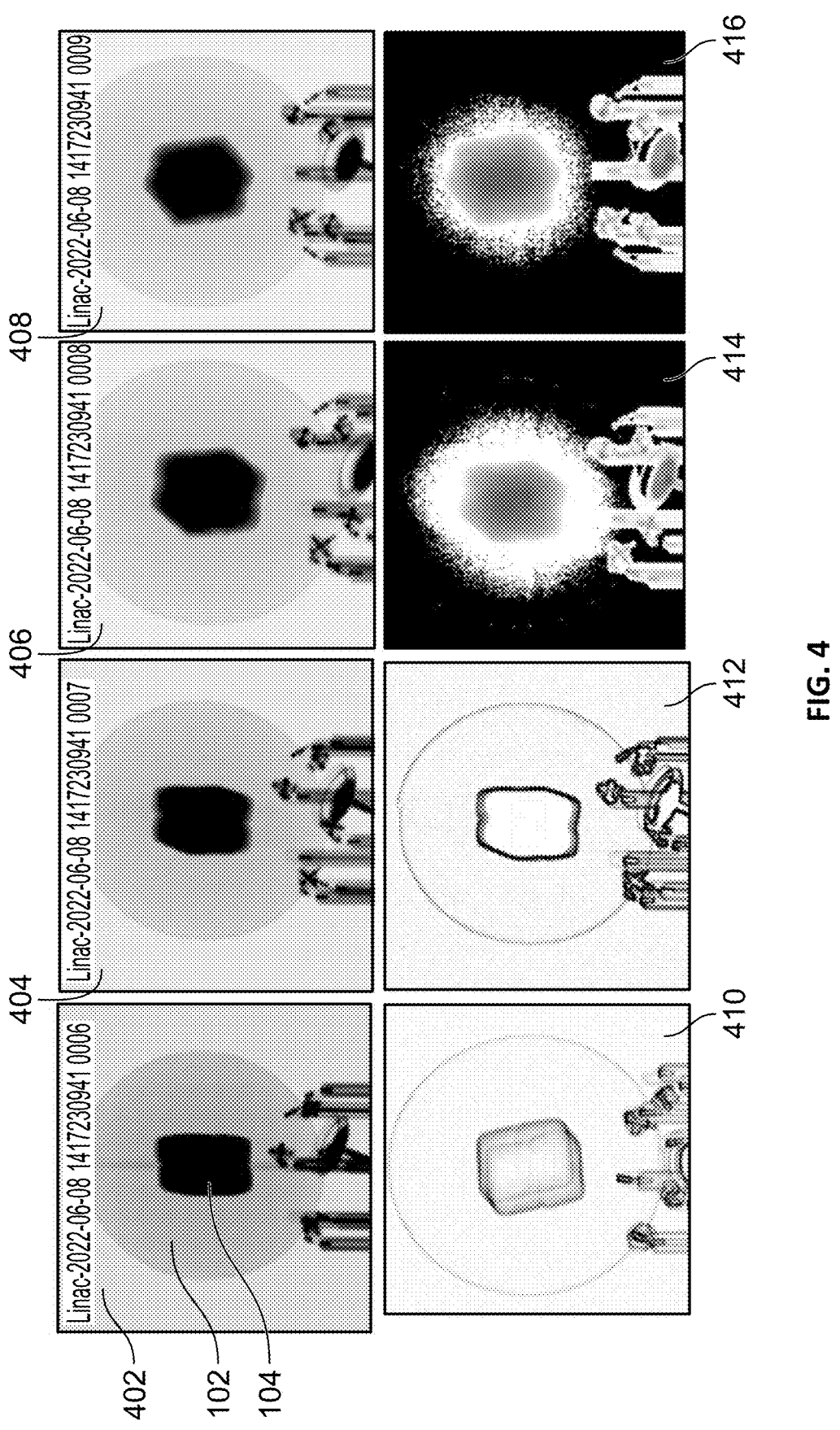
FIG. 4 shows a plurality of X-ray scan images of the frame holding a drug simulant along with a plurality of X-ray scan images of the drug simulant extracted from the plurality of X-ray scan images of the frame, in accordance with some embodiments of the present specification.

FIG. 4 shows a first scan image 402, a second scan image 404, a third scan image 406, and a fourth scan image 408 of the frame 102 holding OUI 104, which in this case is a drug simulant, in a plurality of rotational orientations. The fifth image 410, sixth image 412, seventh image 414, and eighth image 416, are X-ray images of the OUI 104 extracted from the respective first, second, third, and fourth X-ray scan images 402, 404, 406, 408 of the frame 102 using an edge-enhancement or detection algorithm.

At step 612d, each of the extracted OUI 104 scan image data is adjusted prior to insertion into stream-of-commerce (SoC) image data of a cargo container. In some embodiments, adjustment of each of the extracted OUI 104 scan image data includes further modulations such as, but not limited to: a) introduction of salt and pepper noise to mimic the noise distribution of the stream of commerce image data into which each of the extracted OUI 104 scan image data is being inserted, and/or b) adjustment of the intensity levels of each of the extracted OUI 104 scan image data to align with the intensity scaling of the stream of commerce image data, which may be due to different dose outputs or even different energy outputs of the scanning system used to generate the stream of commerce image data. In embodiments, an adjustment of the intensity levels is performed by moving the grayscale of each of the extracted OUI 104 scan image data on the basis of a function (that may be linear, quadratic or any other function known to persons of ordinary skill in the art) to best match the intensity scaling of the stream of commerce image data, and/or c) dimensional scaling of each of the extracted OUI 104 scan image data to account for the change in magnification for near and far positions within the stream of commerce image data. In some embodiments, dimensional scaling is achieved by changing the size of each of the extracted OUI 104 scan image data to be inserted into the stream of commerce image data. When reducing a size of an extracted OUI 104 scan image data, pixel values are determined from the pre-existing values and a scaling factor. For example, pixels will overlap and an average or maximum value may be calculated to determine the new pixel value. When increasing the size of an extracted OUI 104 scan image data, a form of interpolation between the pre-existing values is performed in order to determine the values of the new pixels, and/or d) adjustment, if required, to ensure that each of the extracted OUI 104 scan image data resides within the boundaries of the cargo container in the stream-of-commerce image data.

At step 614d, each of the extracted OUI 104 scan image data is inserted into the stream-of-commerce (SoC) image data in order to generate a plurality of required full cargo container images needed for training.

Fifth Set of Steps

At step 604e, the translation table 114 is triggered (configured through a PLC command from the at least one computing device) to move the frame 102 through the X-ray beam in a first linear direction, wherein a detector array is configured to capture a first image of the frame 102. Subsequently, the translation table 114 is triggered and thus configured to move the frame 102 through the X-ray beam in a second linear direction, opposite to the first direction, wherein the detector array is configured to capture a second image of the frame 101. That is, for an orientation of the frame 102 (and hence of the OUI 104) two X-ray scan images are captured.

At step 606e, the turntable 112 is triggered to rotate the frame 102 by a predefined 'x' degrees, incrementally from the previous orientation, around the X-axis 120ₓ.

At step 608e, it is determined if the total number of incremental rotations $n_x$ of the frame 102 around the X-axis 120ₓ is greater than $[(360/x)-1]$, where 'x' is the predefined incremental degrees of rotation. In various embodiments, 'x' ranges from 1 to 90 degrees. In a non-limiting example, 'x' is 15 degrees. Therefore, the total number of incremental rotations $n_x=[(360/15)-1]=23$. It should be appreciated that the total number of incremental rotations $n_x$ is 23 and not 24 since, in the final incremental rotation around the X-axis, the frame 102 is again positioned in the first rotational orientation on the roller base plate 110.

If $n_x \leq [(360/x)-1]$ then, flow moves back to step 604e and the translation movements of step 604e are repeated in order to capture another set of two X-ray scan images. Thereafter, the flow moves to step 606e for a next incremental rotation of the frame 102.

If $n_x > [(360/x)-1]$ then, the method 600 moves back to step 602d of the fourth set of steps.

Sixth Set of Steps

In some embodiments, the method 600 implements the sixth set of steps (instead of the third, fourth and fifth set of steps) when the scintillating crystals, in the detector array, have substantially similar vertical and horizontal crystal resolutions—that is, the scintillating crystals have square cross-sections.

At step 620, OUI 104 scan image data is extracted (owing to a change in attenuation or contrast between the QUI 104 and the frame 102 material) from the captured synthetic X-ray scan data in order to isolate the OUI 104 scan image data corresponding to a plurality of rotational orientations of the frame 102 around the X and Y-axes. In some embodiments, the OUI 104 scan image data is isolated and extracted using a combination of intensity thresholding and bilateral or edge-enhancement filtering. Thus, the OUI 104 scan image data is extracted based on determining the edges of the OUI 104 scan image relative to the surrounding background scan image of the frame 102, prior to extraction.

At step 622, each of the extracted OUI 104 scan image data is adjusted prior to insertion into stream-of-commerce (SoC) image data of a cargo container. In some embodiments, adjustment of each of the extracted OUI 104 scan image data necessarily includes a rotational orientation of the extracted OUI 104 scan image data around the Z-axis 120_z. In embodiments, each of the extracted OUI 104 scan image is rotated by a predefined 'z' degrees, incrementally from a previous orientation, around the Z-axis 120_z. In some embodiments, the total number of incremental rotations $n_z$ of each of the extracted OUI 104 scan image data, around the Z-axis 120_z, is equal to 360/z. In the non-limiting example, where z=15 degrees, the total number of incremental rotations $n_z=360/15=24$.

In some embodiments, adjustment of each of the extracted OUI 104 scan image data includes further modulations such as, but not limited to: a) introduction of salt and pepper noise to "mimic" the noise distribution of the stream of commerce image data into which each of the extracted QUI 104 scan image data is being inserted, and/or b) adjustment of the intensity levels of each of the extracted OUI 104 scan image data to align with the intensity scaling of the stream of commerce image data, which may be due to different dose outputs or even different energy outputs of the scanning system used to generate the stream of commerce image data, and/or c) dimensional scaling of each of the extracted OUI 104 scan image data to account for the change in magnification for near and far positions within the stream of commerce image data, and/or d) adjustment, if required, to ensure that each of the extracted OUI 104 scan image data resides within the boundaries of the cargo container in the stream-of-commerce image data.

At step 624, each of the extracted OUI 104 scan image data is inserted into the stream-of-commerce (SoC) image data in order to generate the necessary full cargo container images needed for training.

As a result of execution of the first, second, third, fourth and fifth steps or of the first, second and sixth set of steps of the method 600, a first set of synthetic X-ray scan data is generated and acquired corresponding to the first height of the plurality of predefined heights at which the frame 102 (and hence the OUI 104 held in the frame 102) is positioned. In some embodiments, the frame 102, and hence the OUI 104, is positioned at different heights, in order to generate different point-of-view images at further orientations.

Consequently, in some embodiments, after generating the first set of synthetic X-ray scan data, the translation table 114 is triggered (through a PLC command from the at least one computing device) to move vertically upwards or downwards in order to position the frame 102 (and hence the OUI 104 held in the frame 102) at a second height of the plurality of predefined heights. Thereafter, either the first, second, third, fourth and fifth steps or the first, second and sixth set of steps of the method 600 are executed in order to generate and acquire a second set of synthetic X-ray scan data corresponding to the second height. In a non-limiting example, the first height corresponds to half height and the second height corresponds to quarter height (the half height and quarter height being the target heights for American National Standards Institute (ANSI) N42.46 testing). However, in other embodiments, the first and second heights may be different from the half height and the quarter height.

Also, in various embodiments, the translation table 114 is triggered to move vertically upwards or downwards in order to position the frame 102 (and hence the OUI 104 held in the frame 102) at additional heights in order to generate additional sets of synthetic X-ray scan data corresponding to each of the additional heights.

In some embodiments, the incremental rotational orientation of x, y, and z in degrees is equal (x=y=z degrees). However, in alternate embodiments, the incremental rotational orientations of x, y and z (in degrees) may be different from one another. In some embodiments, the incremental rotational orientations of each of x, y and z ranges from 1 to 90 degrees. In one embodiment, the incremental rotational orientation x, which is equal to y, which is equal to z equals 15 degrees.

In embodiments, the method 600 may implement incremental rotation of the frame 102 around X, Y and Z-axes in any order. Thus, the flowchart of FIG. 6 illustrates rotation of the frame around the Y-axis followed by X-axis and Z-axis only as a non-limiting example.

In some embodiments, each of the synthetic X-ray scan data of the frame 102 (holding the OUI 104) is tagged with a plurality of descriptive data such as, but not limited to, data pertaining to the scan number, object position or orientation, height, tunnel position (of the X-ray scanning machine used to generate the synthetic X-ray scan data) and sequence number.

It should be appreciated that the number of X-ray scan image orientations of the frame 102 may vary based upon the predefined incremental rotational orientations of the frame 102 around the X, Y and Z-axes. Smaller incremental rotational orientations (that is, x, y and z degrees) of the frame 102 may result in a greater number of rotations and consequently, a higher number of synthetic X-ray scan images for training purposes. However, at some point the resolution of the rotation will not result in significant enough a change in the resultant image to add any gain. In some embodiments, the line width for high-energy imaging systems is approximately 3 mm. This means any rotation of the frame 102 that results in less than a 1.5 mm change in the "shadow" cast on the detector array will convey little to no appreciable change.

Bulk Material Imaging

Figure 5:
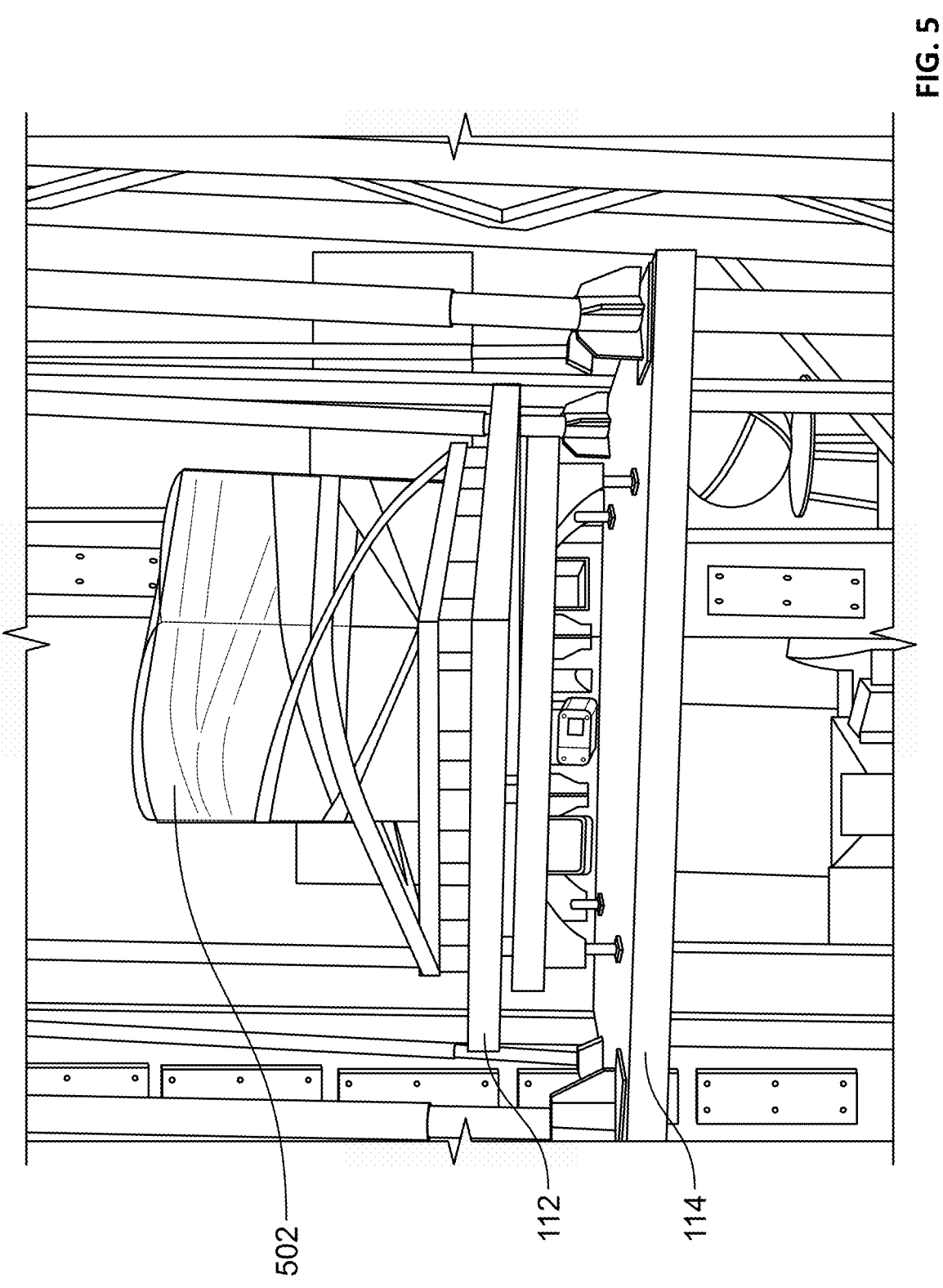
FIG. 5 shows a bulk material or cargo item that is positioned on a rotating turntable which, in turn, is fixed on a translational table, in accordance with some embodiments of the present specification.

In some embodiments, the OUI 104 is a bulk material or cargo item such as, but not limited to, pallets, boxes, drums and crates. In such embodiments, synthetic X-ray scan data of the bulk material or cargo item is generated and captured by implementing only the first set of steps 602a through 608a of the method 600 of FIG. 6. FIG. 5 shows a bulk material or cargo item such as, for example, drums 502 being positioned directly on the rotating turntable 112 which in turn is fixed on the translational table 114, in accordance with some embodiments of the present specification. Consequently, a method of generating synthetic X-ray scan data of the bulk material or cargo item 502 is based on the use of just the rotating turntable 112 for providing multiple orientations of the bulk cargo 502 and the translational table 114 for providing linear motion to the bulk cargo 502 through the X-ray beam. The reason for this is that bulk cargo items are not expected to lay within a cargo container in rotational orientations around X and Z-axes since they are fixed by the platform on which they are positioned.

Thus, the first set of steps for generating and capturing synthetic X-ray scan data of the bulk cargo 502 comprise causing the turntable 112 to incrementally rotate the bulk cargo 502 around a vertical axis, that is the Y-axis, by a predetermined angle until one full rotation around the vertical axis is completed, wherein for each unique incremental rotational orientation of the bulk cargo 502 around the vertical axis the translational table 114 moves the bulk cargo through the X-ray beam in first and second mutually opposing directions in order to generate a pair of scan image data.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A system for automatically generating a plurality of X-ray scan data of a cargo container embedded with an object, wherein the object is embedded in a plurality of orientations in three dimensional space within the cargo container, and wherein the three dimensional space is defined by first, second and third mutually orthogonal axes, comprising:

a frame for holding the object;

a base plate for supporting the frame, wherein the frame is positioned in an initial orientation with respect to the first, second and third axes;

a first table for supporting the base plate;

a second table for supporting the first table, wherein the second table is capable of imparting linear motion to the frame, and wherein the first table is capable of imparting rotational motion to the frame around the first axis independent of the second table;

first and second robotic arms and associated cameras configured to locate and rotate the frame around the second and third axes respectively;

an X-ray source for generating an X-ray beam that impinges on the frame and a detector array for capturing resultant X-ray scan data; and a computing device having a memory and a processor, wherein the computing device controls movements of the first table, second table and the first and second robotic arms, and wherein the memory stores a plurality of programmatic instructions which when executed cause the processor to:

sequentially implement first, second, third, fourth and fifth set of steps in order to generate X-ray scan data corresponding to the frame;

isolate and extract X-ray scan data corresponding to the object from the X-ray scan data corresponding to the frame;

adjust the X-ray scan data corresponding to the object; and insert each of the adjusted X-ray scan data corresponding to the object into X-ray scan data of the cargo container in order to generate the plurality of X-ray scan data of the cargo container embedded with the object.

2. The system of claim 1, wherein the second set of steps is implemented only after completion of the first set of steps, wherein the third set of steps is implemented only after completion of the second set of steps, and wherein the fourth and fifth set of steps are implemented only after completion of the third set of steps.

3. The system of claim 2, wherein the first set of steps includes causing the first table to incrementally rotate the frame around the first axis by a predetermined first angle until one full rotation around the first axis is completed, wherein for each unique incremental rotational orientation of the frame around the first axis the second table moves the frame through the X-ray beam in first and second mutually opposing directions in order to generate a pair of scan image data.

4. The system of claim 3, wherein the second set of steps includes causing the first robotic arm to incrementally rotate the frame around the second axis by a predetermined second angle until one full rotation around the second axis is completed, wherein for each unique incremental rotational orientation of the frame around the second axis the first set of steps are repeated.

5. The system of claim 4, wherein the third set of steps includes causing the second robotic arm to incrementally rotate the frame around the third axis by a predetermined third angle until one full rotation around the third axis is completed, wherein for each unique incremental rotational orientation of the frame around the third axis the first set of steps are repeated.

6. The system of claim 5, wherein the fifth set of steps includes causing the first table to incrementally rotate the frame around the second axis by the predetermined second angle until one full rotation around the second axis is completed, wherein for each unique incremental rotational orientation of the frame around the second axis the second table moves the frame through the X-ray beam in first and second mutually opposing directions in order to generate a pair of scan image data.

7. The system of claim 6, wherein the fourth set of steps includes causing the second robotic arm to incrementally rotate the frame around the third axis by the predetermined third angle until one full rotation around the third axis is completed, wherein for each unique incremental rotational orientation of the frame around the third axis the fifth set of steps are repeated.

8. The system of claim 7, wherein each of the first, second and third angles is the same.

9. The system of claim 7, wherein each of the first, second and third angles is 15 degrees.

10. The system of claim 7, wherein each of the first, second and third angles ranges from 1 to 90 degrees.

11. The system of claim 1, wherein the frame is positioned at a first height of a plurality of predefined heights in order to generate the X-ray scan data corresponding to the frame.

12. The system of claim 11, wherein the frame is positioned at a second height of the plurality of predefined heights and the first, second, third, fourth and fifth set of steps are sequentially implemented again in order to generate another set of X-ray scan data corresponding to the frame at the second height.

13. The system of claim 1, wherein adjustment of the X-ray scan data corresponding to the object comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container.

14. The system of claim 1, wherein a shape of the frame is one of spherical, cubical, regular polygon or a cylindrical tube with or without hemispherical ends.

15. The system of claim 1, wherein the frame is made from polystyrene.

16. The system of claim 1, wherein each of a plurality of scintillating crystals of the detector array has different vertical and horizontal crystal resolutions.

17. A system for automatically generating a plurality of X-ray scan data of a cargo container embedded with an object, wherein the object is embedded in a plurality of orientations in three dimensional space within the cargo container, and wherein the three dimensional space is defined by first, second and third mutually orthogonal axes, comprising:

a frame for holding the object;

a base plate for supporting the frame, wherein the frame is positioned in an initial orientation with respect to the first, second and third axes;

a first table for supporting the base plate;

a second table for supporting the first table, wherein the second table is capable of imparting linear motion to the frame, and wherein the first table is capable of imparting rotational motion to the frame around the first axis independent of the second table;

a robotic arm and associated camera configured to locate and rotate the frame around the second axis;

an X-ray source for generating an X-ray beam that impinges on the frame and a detector array for capturing resultant X-ray scan data; and a computing device having a memory and a processor, wherein the computing device controls movements of the first table, second table and the robotic arm, and wherein the memory stores a plurality of programmatic instructions which when executed cause the processor to:

sequentially implement first and second set of steps in order to generate X-ray scan data corresponding to the frame;

isolate and extract X-ray scan data corresponding to the object from the X-ray scan data corresponding to the frame;

adjust the X-ray scan data corresponding to the object; and insert each of the adjusted X-ray scan data corresponding to the object into X-ray scan data of the cargo container in order to generate the plurality of X-ray scan data of the cargo container embedded with the object.

18. The system of claim 17, wherein the second set of steps is implemented only after completion of the first set of steps.

19. The system of claim 18, wherein the first set of steps includes causing the first table to incrementally rotate the frame around the first axis by a predetermined first angle until one full rotation around the first axis is completed, wherein for each unique incremental rotational orientation of the frame around the first axis the second table moves the frame through the X-ray beam in first and second mutually opposing directions in order to generate a pair of scan image data.

20. The system of claim 19, wherein the second set of steps includes causing the robotic arm to incrementally rotate the frame around the second axis by a predetermined second angle until one full rotation around the second axis is completed, wherein for each unique incremental rotational orientation of the frame around the second axis the first set of steps are repeated.

21. The system of claim 20, wherein adjustment of the X-ray scan data corresponding to the object includes incrementally rotating the X-ray scan data corresponding to the object around the third axis by a predefined third angle.

22. The system of claim 21, wherein adjustment of the X-ray scan data corresponding to the object further comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container.

23. The system of claim 22, wherein each of the first, second and third angles is the same.

24. The system of claim 22, wherein each of the first, second and third angles is 15 degrees.

25. The system of claim 22, wherein each of the first, second and third angles ranges from 1 to 90 degrees.

26. The system of claim 17, wherein a shape of the frame is one of spherical, cubical, regular polygon or a cylindrical tube with or without hemispherical ends.

27. The system of claim 17, wherein the frame is made from polystyrene.

28. The system of claim 17, wherein each of a plurality of scintillating crystals of the detector array has similar vertical and horizontal crystal resolutions.

29. A method for automatically generating a plurality of X-ray scan data of a cargo container embedded with an object, wherein the object is embedded in a plurality of orientations in three dimensional space within the cargo container, wherein the three dimensional space is defined by first, second and third mutually orthogonal axes, wherein the object is held in a frame supported on a base plate, wherein the base plate is supported on a first table, wherein the first table is supported on a second table such that the second table is capable of imparting linear motion to the frame and the first table is capable of imparting rotational motion to the frame around the first axis independent of the second table, and wherein a robotic arm and associated camera is configured to locate and rotate the frame around the second axis, the method comprising:

executing a first set of steps, wherein the first set of steps include causing the first table to incrementally rotate the frame around the first axis by a predetermined first angle until one full rotation around the first axis is completed, and wherein for each unique incremental rotational orientation of the frame around the first axis the second table moves the frame through the X-ray beam in first and second mutually opposing directions in order to generate a pair of scan image data;

executing a second set of steps after completion of the first set of steps, wherein the second set of steps include causing the robotic arm to incrementally rotate the frame around the second axis by a predetermined second angle until one full rotation around the second axis is completed, wherein for each unique incremental rotational orientation of the frame around the second axis the first set of steps are repeated, and wherein execution of the first and second set of steps results in generation of X-ray scan data corresponding to the frame;

isolating and extracting X-ray scan data corresponding to the object from the X-ray scan data corresponding to the frame;

adjusting the X-ray scan data corresponding to the object; and inserting each of the adjusted X-ray scan data corresponding to the object into X-ray scan data of the cargo container in order to generate the plurality of X-ray scan data of the cargo container embedded with the object.

30. The method of claim 29, wherein adjustment of the X-ray scan data corresponding to the object includes incrementally rotating the X-ray scan data corresponding to the object around the third axis by a predefined third angle.

31. The method of claim 30, wherein adjustment of the X-ray scan data corresponding to the object further comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container.

32. The method of claim 29, wherein each of the first, second and third angles is the same.

33. The method of claim 29, wherein each of the first, second and third angles is 15 degrees.

34. The method of claim 29, wherein each of the first, second and third angles ranges from 1 to 90 degrees.

35. The method of claim 29, wherein a shape of the frame is one of spherical, cubical, regular polygon or a cylindrical tube with or without hemispherical ends.

36. The method of claim 29, wherein the frame is made from polystyrene.

37. The method of claim 29, wherein each of a plurality of scintillating crystals of the detector array has similar vertical and horizontal crystal resolutions.

38. A system for automatically generating a plurality of X-ray scan data of a cargo container embedded with an object, wherein the object is embedded in a plurality of orientations in three dimensional space within the cargo container, comprising:

a frame for holding the object;

a base plate for supporting the frame, wherein the frame is positioned in an initial orientation with respect to a vertical axis;

a first table for supporting the base plate;

a second table for supporting the first table, wherein the second table is capable of imparting linear motion to the frame, and wherein the first table is capable of imparting rotational motion to the frame around the vertical axis independent of the second table;

an X-ray source for generating an X-ray beam that impinges on the frame and a detector array for capturing resultant X-ray scan data; and a computing device having a memory and a processor, wherein the computing device controls movements of the first table and second table, and wherein the memory stores a plurality of programmatic instructions which when executed cause the processor to:

capture X-ray scan data corresponding to the frame by triggering the first table to incrementally rotate the frame around the vertical axis by a predetermined angle until one full rotation around the vertical axis is completed, and wherein for each unique incremental rotational orientation of the frame around the vertical axis the second table moves the frame through the X-ray beam in first and second mutually opposing directions in order to generate a pair of scan image data;

isolate and extract X-ray scan data corresponding to the object from the X-ray scan data corresponding to the frame;

adjust the X-ray scan data corresponding to the object; and insert each of the adjusted X-ray scan data corresponding to the object into X-ray scan data of the cargo container in order to generate the plurality of X-ray scan data of the cargo container embedded with the object.

39. The system of claim 38, wherein the object is a bulk cargo item.

40. The system of claim 38, wherein adjustment of the X-ray scan data corresponding to the object comprises one or more of the introduction of salt and pepper noise to mimic the noise distribution of the X-ray scan data of the cargo container, modulating the intensity level to align with the intensity scaling of the X-ray scan data of the cargo container, dimensional scaling to account for a change in magnification for near and far positions within the X-ray scan data of the cargo container, or ensuring that the X-ray scan data corresponding to the object resides within the boundaries of the cargo container in the X-ray scan data of the cargo container.

41. The system of claim 38, wherein the predefined angle is 15 degrees.

42. The system of claim 38, wherein the predefined angles range from 1 to 90 degrees.

43. The system of claim 38, wherein a shape of the frame is one of spherical, cubical, regular polygon or a cylindrical tube with or without hemispherical ends.

44. The system of claim 38, wherein the frame is made from polystyrene.

* * * * *